(12) United States Patent
Jammes

(10) Patent No.: US 7,162,510 B2
(45) Date of Patent: Jan. 9, 2007

(54) COMMUNICATION SYSTEM FOR A CONTROL SYSTEM OVER ETHERNET AND IP NETWORKS

(75) Inventor: Francois Jammes, Corenc (FR)

(73) Assignee: Schneider Automation Inc., North Andover, MA (US)

( * ) Notice: Subject to any disclaimer, the term of this patent is extended or adjusted under 35 U.S.C. 154(b) by 654 days.

(21) Appl. No.: 10/120,037

(22) Filed: Apr. 10, 2002

(65) Prior Publication Data

US 2002/0194365 A1 Dec. 19, 2002

Related U.S. Application Data

(63) Continuation of application No. 09/623,689, filed as application No. PCT/US99/05675 on Mar. 15, 1999.

(60) Provisional application No. 60/078,223, filed on Mar. 16, 1998.

(51) Int. Cl.
*G06F 15/16* (2006.01)

(52) U.S. Cl. ............... 709/203; 709/217; 709/219; 709/223

(58) Field of Classification Search ........... 709/208, 709/209
See application file for complete search history.

(56) References Cited

U.S. PATENT DOCUMENTS

| | | | |
|---|---|---|---|
| 3,971,000 A | 7/1976 | Cromwell | |
| 4,251,858 A | 2/1981 | Cambigue et al. | |
| 4,319,338 A | 3/1982 | Grudowski et al. | |
| 4,669,040 A | 5/1987 | Pettit et al. | |
| 4,688,167 A | 8/1987 | Agarwal | |
| 4,701,845 A | 10/1987 | Andreasen et al. | |
| 4,845,644 A | 7/1989 | Anthias et al. | |
| 4,858,152 A | 8/1989 | Estes | |
| 4,897,777 A | 1/1990 | Janke et al. | |
| 4,912,623 A | 3/1990 | Rantala et al. | |
| 4,918,690 A | 4/1990 | Markkula, Jr. et al. | |
| 4,937,777 A | 6/1990 | Flood et al. | |
| 4,949,274 A | 8/1990 | Hollander et al. | |
| 4,953,074 A | 8/1990 | Kametani et al. | |
| 4,974,151 A | 11/1990 | Advani et al. | |
| 4,979,107 A | 12/1990 | Advani et al. | |

(Continued)

FOREIGN PATENT DOCUMENTS

DE 37 19283 A1 12/1988

(Continued)

OTHER PUBLICATIONS

Communication from the European Patent Office including International Search Report from WO 03/100611, mailed Jul. 9, 2003.

(Continued)

*Primary Examiner*—Ario Etienne
*Assistant Examiner*—LaShonda Jacobs

(57) ABSTRACT

A communication system is provided for communication within a control system. The communication system has a plurality of simple devices connected to an intra-level communications network, each simple device being adapted to directly exchange data with the other simple devices. The communications system also has at least one intelligent device connected to the intra-level communications network, each intelligent device being adapted to directly exchange data with each simple device on the intra-level communications networks. The communication system can have a plurality of intra-level communications networks. The intra-level communications networks can be directly be connected by an intra-level core connector or by an inter-level core connector through an inter-level network of the intelligent devices.

22 Claims, 7 Drawing Sheets

U.S. PATENT DOCUMENTS

| | | | |
|---|---|---|---|
| 4,992,926 A | 2/1991 | Janke et al. | |
| 5,012,402 A | 4/1991 | Akiyama | |
| 5,023,770 A | 6/1991 | Siverling | |
| 5,047,959 A | 9/1991 | Phillips et al. | |
| 5,072,356 A | 12/1991 | Watt et al. | |
| 5,072,412 A | 12/1991 | Henderson, Jr. et al. | |
| 5,109,487 A | 4/1992 | Ohgomori et al. | |
| 5,122,948 A | 6/1992 | Zapolin | |
| 5,131,092 A | 7/1992 | Sackmann et al. | |
| 5,134,574 A | 7/1992 | Beaverstock et al. | |
| 5,151,896 A | 9/1992 | Bowman et al. | |
| 5,151,978 A | 9/1992 | Bronikowski et al. | |
| 5,157,595 A | 10/1992 | Lovrenich | |
| 5,159,673 A | 10/1992 | Sackmann et al. | |
| 5,161,211 A | 11/1992 | Taguchi et al. | |
| 5,162,982 A | 11/1992 | Mentler | |
| 5,165,030 A | 11/1992 | Barker | |
| 5,179,700 A | 1/1993 | Aihara et al. | |
| 5,187,787 A | 2/1993 | Skeen et al. | |
| 5,225,974 A | 7/1993 | Mathews et al. | |
| 5,245,704 A | 9/1993 | Weber et al. | |
| 5,251,302 A | 10/1993 | Weigl et al. | |
| 5,283,861 A | 2/1994 | Dangler et al. | |
| 5,297,257 A | 3/1994 | Struger et al. | |
| 5,307,463 A | 4/1994 | Hyatt et al. | |
| 5,321,829 A | 6/1994 | Zifferer | |
| 5,343,469 A | 8/1994 | Ohshima | |
| 5,349,675 A | 9/1994 | Fitzgerald et al. | |
| 5,386,524 A | 1/1995 | Lary et al. | |
| 5,391,970 A * | 2/1995 | Chaffee et al. | 318/618 |
| 5,398,336 A | 3/1995 | Tantry et al. | |
| 5,406,473 A | 4/1995 | Yoshikura et al. | |
| 5,420,977 A | 5/1995 | Sztipanovits et al. | |
| 5,430,730 A | 7/1995 | Sepulveda-Garese et al. | |
| 5,440,699 A | 8/1995 | Farrand et al. | |
| 5,446,868 A | 8/1995 | Gardea et al. | |
| 5,471,617 A | 11/1995 | Farrand et al. | |
| 5,528,503 A | 6/1996 | Moore et al. | |
| 5,598,536 A | 1/1997 | Slaughter, III et al. | |
| 5,611,059 A | 3/1997 | Benton et al. | |
| 5,613,115 A | 3/1997 | Gihl et al. | |
| 5,623,652 A | 4/1997 | Vora et al. | |
| 5,625,781 A | 4/1997 | Cline et al. | |
| 5,684,375 A | 11/1997 | Chaffee et al. | |
| 5,689,688 A * | 11/1997 | Strong et al. | 713/375 |
| 5,699,350 A | 12/1997 | Kraslavsky | |
| 5,734,831 A | 3/1998 | Sanders | |
| 5,790,977 A | 8/1998 | Ezekiel | |
| 5,793,954 A | 8/1998 | Baker et al. | |
| 5,801,689 A | 9/1998 | Huntsman | |
| 5,805,442 A | 9/1998 | Crater et al. | |
| 5,828,672 A | 10/1998 | Labonte et al. | |
| 5,835,507 A | 11/1998 | Huang et al. | |
| 5,862,391 A | 1/1999 | Salas et al. | |
| 5,950,006 A | 9/1999 | Crater et al. | |
| 5,975,737 A | 11/1999 | Crater et al. | |
| 5,982,362 A | 11/1999 | Crater et al. | |
| 5,990,884 A | 11/1999 | Douma et al. | |
| 5,997,167 A | 12/1999 | Crater et al. | |
| 6,016,523 A | 1/2000 | Zimmerman et al. | |
| 6,028,866 A | 2/2000 | Engel et al. | |
| 6,032,203 A | 2/2000 | Heidhues | |
| 6,058,251 A | 5/2000 | Okamoto et al. | |
| 6,061,721 A | 5/2000 | Ismael et al. | |
| 6,122,668 A * | 9/2000 | Teng et al. | 709/231 |
| 6,122,670 A | 9/2000 | Bennett et al. | |
| 6,134,522 A | 10/2000 | Fritz et al. | |
| 6,151,625 A | 11/2000 | Swales et al. | |
| 6,151,640 A | 11/2000 | Buda et al. | |
| 6,201,996 B1 | 3/2001 | Crater et al. | |
| 6,233,626 B1 | 5/2001 | Swales et al. | |
| 6,263,487 B1 | 7/2001 | Stripf et al. | |
| 6,282,454 B1 | 8/2001 | Papadopoulos et al. | |
| 6,311,101 B1 | 10/2001 | Kastner | |
| 6,321,272 B1 | 11/2001 | Swales | |
| 6,327,511 B1 | 12/2001 | Naismith et al. | |
| 6,370,550 B1 | 4/2002 | Douma et al. | |
| 6,370,569 B1 | 4/2002 | Austin | |
| 6,424,872 B1 | 7/2002 | Glanzer et al. | |
| 6,434,157 B1 | 8/2002 | Dube et al. | |
| 6,453,210 B1 | 9/2002 | Belotserkovsky et al. | |
| 6,466,995 B1 | 10/2002 | Swales et al. | |
| 6,484,061 B1 | 11/2002 | Papadopoulos et al. | |
| 6,505,341 B1 | 1/2003 | Harris et al. | |
| 2001/0012270 A1 * | 8/2001 | Godoroja | 370/230 |
| 2002/0064180 A1 * | 5/2002 | Takeda et al. | 370/468 |
| 2002/0176441 A1 | 11/2002 | Swales et al. | |

FOREIGN PATENT DOCUMENTS

| | | |
|---|---|---|
| DE | 44 10 171 C1 | 4/1995 |
| DE | 296 00 609 U1 | 3/1997 |
| DE | 296 22 133 U1 | 8/1997 |
| DE | 196 15 093 A1 | 10/1997 |
| EP | 0 542 657 A1 | 5/1993 |
| EP | 0 814 393 A1 | 12/1997 |
| EP | 0 825 506 A2 | 2/1998 |
| EP | 1 107 500 A2 | 6/2001 |
| EP | 1 107 500 A3 | 6/2001 |
| JP | 60192447 A | 9/1985 |
| WO | WO 97/18636 | 5/1997 |
| WO | WO 98/53581 | 11/1998 |

OTHER PUBLICATIONS

Communication from the European Patent Office including International Search Report from WO 03/088620, mailed Sep. 17, 2003.

Communication from the European Patent Office including International Search Report from WO 03/085921, mailed Oct. 9, 2003.

Communication from the European Patent Office including International Search Report from WO 99/48245, mailed Oct. 25, 1999.

Kubota, Y. et al., NTT Human Interface Laboratories, "Proposal of the Robot System With Information Sending Mechanism," Presented at the 14th Annual Conference of the Robotics Society of Japan, Nov. 1-3, 1996, pp. 341-342. (In Japanese w/ English translation included).

Brugger, Peter, "Web Technology in Embedded Computing" *Industrial Computer 97—Special Edition*; Sep. 3, 1997 (in German w/ English translation included).

Williams, Tom, et al., "Java Goes to Work Controlling Networked Embedded Systems," *Computer Design*, Aug. 1996, pp. 36.

Fu, K.S., et al., *Robotics: Control, Sensing, Vision and Intelligence*, Chapter Five: Control of Robot Manipulators; Sections 5.1-5.3.1.

*Automation Strategies*, by Automation Research Corporation, Feb. 1998, pp. 1-32.

Lecuivre, J., et al., *A framework for validating distributed real time applications by performance evaluation of communication profiles*, Factory Communication Systems, 1995, WFCS '95, Proceedings, 1995 IEEE International Workshop on Leysin, Switzerland Oct. 4-6, 1995, New York, NY, pp. 37-46.

*Modicon Modbus Protocol Reference Guide*, Modicon, Inc., Jun. 1996, pp. 1-12.

Swales, Andy, *Topology Considerations for Modbus/Therenet Automation Networks*, Law Controls, Inc., Jan. 25, 2000.

Beaupre, Jacques, et al., *Advanced Monitoring Technologies for Substations*, IEEE, Oct. 9, 2000, pp. 287-292.

"Java and Programmable Automation Controllers," CiMax: Edition Terrain, No. 13—May-Jun. 1997, copy in French, Certificate of Accuracy of translation from Merrill Corporation, dated May 19, 2004 and translated copy.

*Abstract of "Implementing distributed controls for FMC's using Internet utilities," S. S. Jagdale and N. Merchant; Computers of Industrial Engineering, vol. 31, No. 1-2, p. 87-90; Oct. 1996 (UK).

*Abstract of "Process control takes to the Net," G. Paula; Mechanical Engineering, vol. 118, No. 12, p. 55, Dec. 1996.

\* Abstract of "Remote interrogation and control of sensors via the internet," Peter L. Furh and Euan F. Mowat; Sensors, vol. 12, No. 12, 6 pp; Dec. 1995.

\* Abstract of "Implementation of CAN/CAN bridges in distributed environments and performance analysis of bridged CAN systems using SAE benchmark," H. Ekiz, A. Kutlu and E. T. Powner; Conference Paper, IEEE Southeastern '97, Engineering the new energy, IEEE, p. 185-7, 1996.

\* Abstract of "Managing interdisciplinary project teams through the Web," R. E. Goodman and P. Chinowsky; Conference Paper, WebbNet 96—World Conference of the Web Society, pp. 180-185, 1996.

\* Abstract of "Learning environment for a process automation system using computer networks," J. Lindfors, L. Yliniemi and K. Leivska; Conference Paper, Step '96—Genes, Nets and Symbols, pp. 137-143, 1996 (Finland).

\* Abstract of "Distributed agent systems for intelligent manufacturing,"D. H. Norrie and B. R. Gaines; Canadian Artificial Intelligence, No. 40, p. 31-3, Autumn 1996 (Canada).

\* Abstract of Proceedings of AUTOFACT 1995 Conference, "Today's Automated, Integrated Factory," Soc. Manuf., Eng., Dearborn, MI; 1995.

\* Abstract of "The ECOSSE Control HyperCourse," C. M. Merrick and J. W. Ponton; Computers & Chemical Engineering, vol. 20, Part B, p. S 1353-8, 1996 (UK).

\* Abstract of "Chemical-better batch controls," T. Crowl; Control & Instrumentation, vol. 28, No. 5, p. 53-4, May 1996 (UK).

\* Abstract of "Industrial software does 32-bit Windows, prepares for the net," W. Labs; I 8CS, vol. 69, No. 3, p. 23-6, 31-4, Mar. 1996, USA.

\* Abstract of "A case study for international remote machining;" G. C. I. Lin and Kao Yung-Chou; Conference Paper, Proc. SPIE—Int. Soc. Opt. Eng., vol. 2620, p. 553-60, 1995.

\* Abstract of "Standardization of long-distance protocols," R. Dinges; Journal Paper, Generation Changes in Network Conductor Systems, ITG—Fachberichte, vol. 134, p. 97-113, 1995 (West Germany).

\* Abstract of "Control system design V. Communications orchestrate process control," F. Glow; In Tech, vol. 36, No. 9, p. 68-74, Sep. 1989.

\* Abstract of "Functions and characteristics of local networks adapted to industrial applications," J. Morlais; Electronique Industrielle, No. 97, p. 56-63, No. 15, 1985; France.

\* Abstract of "Intelligent supervisory control of submerged-arc furnaces," Markus A. Reuter, Carla Pretorius, Chloe West, Peter Dixon and Morne Oosthuizen, JOM vol. 48, No. 12, Dec. 1996, p. 49-51.

\* Abstract of "Simulation on the integration of process control systems of rolling mill plants through standard networks,"Choo Young Yeol, Hwang Hwa Won and Kim Cheeha, Proceedings of the Industrial Computing Conference, Instrument Society of America, Research Triangle Park, NC, USA. p. 1-14; vol. 6, No. 1, 1996.

\* Abstract of "Environmental waste control digest," Clayton H. Billings; Public Works vol. 127 No. 7, 6 pp, Jun. 1996.

\* Abstract of "Experiments in tele-handling and tele-machining at the macro and microscales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

\* Abstract of "A phototyping and reverse engineering system for mechanical parts-on-demand on the national network," Fred Hansen, Elias Pavlakos, Eric Hoffman, Takeo Kanade, Raj Reddy, Paul Wright; Journal of Manufacturing Systems, vol. 12 No. 4, p. 269-281; 1993.

\* Abstract of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, p. 99-104; Feb. 1991.

\* Abstract of User's Aspect of Telecommunication and Information Processing in Plant Factory; Hashimoto Yasushi (1); Journal of the Institute of Electronics, Information and Communication Engineers, vol. 78, No. 5, p. 475-81, Fig. 3, Ref. 7, 1995. (Japan).

\* Abstract of "High-efficient application technology of DCS from the viewpoint of users," Oka Norihito (1); Narita Tsutomu (1); (1) Yamatake-Honeywell Co., Ltd.; Otomeshon, vol. 40, No. 2, p. 24-28, Fig. 5, part 2, 1995. (Japan).

\* Abstract of "Users' experience with software tools for process integration. General results" Stougie, L.; Roeterink, H.J.H.; Van Wijk, A.; Stikkelman, R.M.; Nov. 1996.

\* Abstract of "Integrated design and process technology. vol. 1" Cooke, D.; Kraemer, B.J.; Sheu, P.C.Y.; Tsai, J.P.; Mittermeir, R.; Society for Design and Process Science, p. 51-57; 1996. (USA).

\* Abstract of "Integrated design and process technology. vol. 2" Tanik, M.M.; Bastani, F.B.; Gibson, D.; Fielding, P.J.; Society for Design and Process Science, p. 423-430, 1996. (USA).

\* Abstract of "Need low-cost networking consider DeviceNet," W. H. Moss; InTech vol. 43:11; p. 30-31, Nov. 1996.

"Plastic Car Bodies Pass the Crash Test," mechanical engineering vol. 118, No. 12; Dec. 1996.

\* http://www.adeptscience.com/archive_pressroom/html/labtechnet.html; Adapt PressRoom Archives. A collection of Adept Scientific's archive news releases. "Hot Coffee on the Internet!".

\* When Technology Standards Become Counterproductive, Kenneth C. Crater, President, Control Technology Corporation, Hopkinton, MA dated Jul. 9, 1999, pp. 1-5.

\* A White Paper State Language for Machine Control, Kenneth C. Crater, President, Control Technology Corporation, Hopkinton, MA dated Jul. 9, 1999, pp. 1-11.

\* New PC-based Process Control & Data Acquisition Software Integrates Remote Internet Capabilities with Fast Pentium Support, Fred A. Putnam, LABTECH President, pp. 1-3.

\* Aug. 1996 CONTROL Magazine—In The News B Electric Utility Industry Embarks on Automation Overhaul, pp. 1-10.

\* Jul. 1997 CONTROL Magazine B Magazine Software Review B NT Package Give Plant Access Through the Web, pp. 1-3.

\* Oct. 1996 CONTROL Magazine B Software Review—Article Archives, pp. 1-2.

\* ICS Instrumentation & Control Systems B Windows NT for real-time control: Which way to go?—ICS Magazine, pp. 1-8.

\* I&CS Jul. 1999—Special Report Software—Software: Open source OSs, objects, *Web-based communications challenge status quo, (Wayne Labs, Senior Technical Editor), pp. 24-49.

\* Landis & Staefa MS 2000, pp. 1-2.

\* Landis & Staefa Standards and Open Protocols Integration System Architecture, p. 1.

\* Annabooks Bookstore, Programming and Interfacing the 8051, by Sencer Yeralan and Asutosh Ahluwalia, pp. 1-2.

\* SoftPLC Corporation—Java Support in SoftPLC Corp. Products, pp. 1-5.

\* Mach J. Company, MachJ, an embeddable, clean room Java Virtual Machine, p. 1.

\* SoftPLC Corporation—The History of Programmable Controllers, Looking Back From the Year 2000 A.D. (Or, How Computers Replaced Proprietary PLC's), pp. 1-7.

\* SoftPLC Corporation—TOPDOC: Advanced PLC program development & documentation software, pp. 1-12.

\* Control Engineering Online Magazine Articles (Jul. 1998)—No, that's not a PC, it's a PLC, pp. 1-2.

\* Rockwell International Corporation, Allen-Bradley Introduces PLC-5/80E Controller for Ethernet Communication Networks, pp. 1-2.

\* Rockwell Automation—Search Results, pp. 1-2.

\* Rockwell International Corporation, Vision & Direction, The Direction of Automation Systems, pp. 1-4.

\* Rockwell International Corporation, Vision & Direction, The Role of Open Systems, pp. 1-4.

\* Rockwell International Corporation—Vision & Direction—The Direction of Automation Systems—Emergence of Application-Specific Control Solutions, pp. 1-2.

\* Rockwell International Corporation—Vision & Direction—The Direction of Automation Systems—The New Factory Worker, pp. 1-2.

\* Rockwell International Corporation, Vision & Direction, Control System Deliverables—The Next Step, pp. 1-2.

*Rockwell International Corporation, Vision & Direction, Conclusion & Acknowledgments, pp. 1-2.
*Rockwell International Corporation—Choices—Perspectives on the Future of Automation Control, p. 1.
*Rockwell International Corporation—Allen-Bradley—Networks—Ethernet for Industrial Control—An Ethernet White Paper—Apr. 21, 1998, pp. 1-13.
*Rockwell International Corporation—Automation Systems Control—General—World-Class Automation Systems from Allen-Bradley, Last Updated: May 7, 1998, pp. 1-12.
*PC Quest, Dec. 1997—Point, click, Control—C-Programmable controllers take the pain out of embedded control, pp. 1-2.
*Berthel—automation with imagination—PCI 100—Programmable logic controller for SIMATIC/IBM IPC, pp. 1-3.
*YAHOO! Personalized Search Results for programmable logic controller internet access, pp. 1-3.
*Siemens—Simatic report Jan. 1997—New in the Simatic Library, pp. 1-2.
*Control Magazine Aug. 1998 B Field Test—Dynamic Software Makes Control Integration Easier, pp. 1-2.
*Design and Reuse Web Site—EDTN Network—Analyze IP Database Content—Analyze Reuse Blocks per taxonomy tree, pp. 1-10.
*Engineering Information, Inc.—Ei CPX WEB [1990-94].
*Using World Wide Web for Control Systems, F. Momal, C. Pinto-Pereira, AT Division CERN, 1211 Geneva 23, http://mish231.cern.ch/Docs/ICALEPCS/1995/icalep95.htm.
*"Ethernet Base Gateway Product," AEG-Modicon, published 1991.
*"Modicon Modbus Plus Network BM85 Bridge Multiplexer User's Guide," Groupe Schneider, Aug. 1995.
*"Modicon Modbus Plus Network Planning and Installation Guide," AEG Schneider Automation, Apr. 1996.
*"Open Modbus/TCP Specification," A. Swales, Sep. 3, 1997.
*"MEB Installation and Programming Manual," Niobrara Research and Development Corporation, Sep. 24, 1997.
*"MEB-TCP Installation and Programming Manual," Niobrara Research and Development Corporation, Oct. 1, 1997.
*"Internet Protocol, Darpa Internet Program, Protocol Specification—RFC:791," Defense Advanced Research Projects Agency, Sep. 1981.
*"Transmission Control Protocol, Darpa Internet Program, Protocol Specification—RFC:793," Defense Advanced Research Projects Agency, Sep. 1981.
*"[comp.unix.programmer] Unix-Socket-FAQ For Network Programming," Vic Metcalfe, Andrew Gierth and other contributors, Jan. 22, 1998.
*"TCP/IP Illustrated, vol. 2, The Implementation," Gary R. Wright, W. Richard Stevens, 1997.
*"Winsock 2 Information," Bob Quinn, 1995-1998 (last updated Dec. 5, 1998).
*Website Information of PROFIBUS; Technical Overview.
*Website Information of ODVA—The Open DeviceNet's Vendor Association.
*Website of PROFIBUS Internation—Welcome Page.
*LabVIEW Graphical Programming for Instrumentation, Networking Reference Manual, 8 Copyright 1993, 1994 National Instruments Corporation, Part No. 320587B-01, Sep. 1994.
*LabVIEW Graphical Programming for Instrumentation, Tutorial for Windows, 8 Copyright 1993, 1994 National Instruments Corporation, Part No. 320593B-01, Sep. 1994.
*LabVIEW Graphical Programming for Instrumentation, Data Acquisition VI Reference Manual for Windows, 8 Copyright 1992, 1994 National Instruments Corporation, Part No. 320536B-01, Sep. 1994.
*RFC 1533 "DHCP Options and BOOTP Vendor Extensions", (http://ietf.org/rfc/rfc1533.txt) IETF, Oct. 1993.
*RFC 1534 "Interoperation between DHCP and BOOTP", (http://ietf.org/rfc/rfc1534.txt) IETF, Oct. 1993.
*RFC 2131 "Dynamic Host configuration Protocol" (http://ietf.org/rfc/rfc21231.txt) IETF, Mar. 1997.
*SOAP, Simple Object Access Protocol (1.1) W3C Note May 8, 2000, (http://www.w3.org/TR/2000/NOTE-SOAP-20000508.

*Statement of Ken Crater pertaining to awareness of LABTECHnet technology, 1 page.
*PCT Search Report for PCT/US99/05675.
*Walid Mostafa, Mukesh Singhal, "*A Taxonomy of Multicast Protocols For Internet Applications*," Jul. 18, 1997 from Computer Communications 20 (1998) 1448-1457.
*Tilo Klesper, "*Der Internet-Zugriff aufs LON*," Aug. 1998 from Automatisieren.
*David J. Preston, "*Internet Protocols Migrate to Silicon For Networking Devices*" from Electronic Design, Apr. 14, 1997.
*TIBCO Website (www.rv.tibco.com) for *TIB/Rendezvous*.
*TIBCO Software, Inc. "*TIB/Rendevous Concepts*", Release 4.1, Nov. 1997.
*IEEE Std 802.11a-1999 (Supplement to IEEE Std 802.11-1999 "Part 11: Wireless LAN Medium Access Control (MAC) and Physical Layer (PHY) specifications Higher-speed Physical Layer in the 5 GHz Band" [Adopted by ISO/IEC and redesignated as ISO/IEC 8802-11:1999/Amd 1:2000(E)].
*P802.1p/D4 Sep. 6, 1966 "P802.1p Standard for Local and Metropolitan Area Networks—Supplemental to Media Access Control (MAC) Bridges: Traffic Class Expediting and Dynamic Multicast Filtering".
SOAP, [online], [retrieved on Aug. 5, 2002]. Retrieved from MSDN Online—Default Home Page using Internet <URL:http://msdn.miscrosoft.com/nhp/ default.asp?contentid=28000523&frame=true>.
PROCOMM Plus—The Leader in terminal emulation, [online], [retrieved on Jan. 13, 2002]. Retrieved from the consumer web page of Symantec, Inc. using Internet <URL:http://www.symantec.com/procomm>.
DEC Terminals—The DEC VT100 and Its Successors, [online], 1999 Richard Shuford, [retrieved on Jan. 13, 2002]. Retrieved from DEC Video Terminals—The VT100 and Its Successors using Internet <URL:http: //www.cs.utk.edu/~shuford/terminal/dec.html>.
NetReach™ Model TPS-2, TelnetPower Switch 2001, [online], [retrieved on Jan. 13, 2002]. Retrieved from Model TPS-2 Telnet + Dial-Up Remote Power Manager, Remote Reboot of Servers, Route . . . using Internet <URL:http://www.wti.com/tps2.htm>.
ANSI.SYS, [online], [retrieved on Jan. 13, 2002]. Retrieved from ANSI.SYS—ansi terminal emulation escape sequences using Internet URL:http://enterprise.aacc.cc.md.us/~rhs/ansi.html>.
Skonnard, Aaron, "SOAP: The Simple Object Access Protocol," [online], [retrieved on Jul. 30, 2002]. Retrieved from SOAP: The Simple Object Access Protocol—MIND Jan. 2000 using Internet <URL: http://www.microsoft.com/Mind/0100/soap/soap.asp>.
Extensible Markup language (XML)—W3C Working Draft Aug. 7, 1997, [online], [retrieved on Aug. 1, 2002]. Retrieved from Extensible Markup Language (XML) website using Internet <URL:http://www.w3.org/ TR/WD-xml-970807.htm>.
Multi-Tech Systems Granted Modem Firmware Upgrade Patent, Apr. 5, 2000, [online], [retrieved on Jan. 3, 2001]. Retrieved from Multi-Tech Press Release using Internet <URL:http://www.multitech.com/NEWS/releases/2000/183.html>.
"Remote Interrogation and Control of Sensors via the Internet," Sensors and Systems; Peter L. Fuhr and Euan F. Mowat; University of Vermont; pp. 25-30; Dec. 1999.
Abstract of "Implementing distributed controls for FMC's using Internet utilities," S. S. Jagdale and N. Merchant; Computers of Industrial Engineering, vol. 31, No. 1-2, p. 87-90; Oct. 1996 (UK).
Abstract of "Process control takes to the Net," G. Paula; Mechanical Engineering, vol. 118, No. 12, p. 55, Dec. 1996.
Abstract of "Remote interrogation and control of sensors via the internet," Peter L. Furh and Euan F. Mowat; Sensors, vol. 12, No. 12, 6 pp; Dec. 1995.
Abstract of "Implementation of CAN/CAN bridges in distributed environments and performance analysis of bridged CAN systems using SAE benchmark," H. Ekiz, A. Kutlu and E. T. Powner; Conference Paper, IEEE Southeastern '97, Engineering the new energy, IEEE, p. 185-7, 1996.

Abstract of "Managing interdisciplinary project teams through the Web," R. E. Goodman and P. Chinowsky; Conference Paper, WebbNet 96—World Conference of the Web Society, pp. 180-185, 1996.

Abstract of "Learning environment for a process automation system using computer networks," J. Lindfors, L. Yliniemi and K. Leivska; Conference Paper, Step '96—Genes, Nets and Symbols, pp. 137-143, 1996 (Finland).

Abstract of "Distributed agent systems for intelligent manufacturing,"D. H. Norrie and B. R. Gaines; Canadian Artificial Intelligence, No. 40, p. 31-3, Autumn 1996 (Canada).

Abstract of Proceedings of AUTOFACT 1995 Conference, "Today's Automated, Integrated Factory," Soc. Manuf., Eng., Dearborn, MI; 1995.

Abstract of "The ECOSSE Control HyperCourse," C. M. Merrick and J. W. Ponton; Computers & Chemical Engineering, vol. 20, Part B, p. S 1353-8, 1996 (UK).

Abstract of "Chemical-better batch controls," T. Crowl; Control & Instrumentation, vol. 28, No. 5, p. 53-4, May 1996 (UK).

Abstract of "Industrial software does 32-bit Windows, prepares for the net," W. Labs; I 8CS, vol. 69, No. 3, p. 23-6, 31-4, Mar. 1996, USA.

Abstract of "A case study for international remote machining;" G. C. I. Lin and Kao Yung-Chou; Conference Paper, Proc. SPIE—Int. Soc. Opt. Eng., vol. 2620, p. 553-60, 1995.

Abstract of "Standardization of long-distance protocols," R. Dinges; Journal Paper, Generation Changes in Network Conductor Systems, ITG—Fachberichte, vol. 134, p. 97-113, 1995 (West Germany).

Abstract of "Control system design V. Communications orchestrate process control," F. Glow; In Tech, vol. 36, No. 9, p. 68-74, Sep. 1989.

Abstract of "Functions and characteristics of local networks adapted to industrial applications," J. Morlais; Electronique Industrielle, No. 97, p. 56-63, Nov. 15, 1985; France.

Abstact of "Inteligent supervisory control of submerged-arc furnaces," Markus A. Reuter, Carla Pretorius, Chloe West, Peter Dixon and Morne Oosthuizen, JOM vol. 48, No. 12, Dec. 1996, p. 49-51.

Abstract of "Simulation on the integration of process control systems of rollling mill plants through standard networks,"Choo Young Yeol, Hwang Hwa Won and Kim Cheeha, Proceedings of the Industrial Computing Conference, Instrument Society of America, Research Triangle Park, NC, USA. p. 1-14; vol. 6, No. 1, 1996.

Abstract of "Environmental waste control digest," Clayton H. Billings; Public Works vol. 127 No. 7, 6 pp. Jun. 1996.

Abstract of "Experiments in tele-handling and tele-machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol 2, 1995.

Abstract of "A phototyping and reverse engineering system for mechanical parts-on-demand on the national network," Fred Hansen, Elias Pavlakos, Eric Hoffman, Takeo Kanade, Raj Reddy, Paul Wright; Journal of Manufacturing Systems, vol. 12 No. 4, p. 269-281; 1993.

Abstract of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, p. 99-104; Feb. 1991.

Abstract of User's Aspect of Telecommunication and Information Processing in Plant Factory; Hashimoto Yasushi (1); Journal of the Institute of Electronics, Information and Communication Engineers, vol. 78, No. 5, p. 475-81, Fig. 3, Ref. 7, 1995. (Japan).

Abstract of "High-efficient application technology of DCS from the viewpoint of users," Oka Norihito (1); Narita Tsutomu (1); (1) Yamatake-Honeywell Co., Ltd.; Otomeshon, vol. 40, No. 2, p. 24-28, Fig. 5, Part 2, 1995, (Japan).

Abstract of "Users' experience with software tools for process integration. General results" Stougie, L.; Roeterink, H.J.H.; Van Wijk, A.; Stikkelman, R.M.; Nov. 1996.

Abstract of "Integrated design and process technology. vol. 1" Cooke, D.; Kraemer, P.J.; Sheu, P.C.Y.; Tsai, J.P.; Mittermeier, R.; Society for Design and Process Science, p. 51-57; 1996. (USA).

Abstract of "Integrated design and process technology. vol. 2" Tanik, M.M.; Bastani, F.B.; Gibson, D.; Fielding, P.J.; Society for Design and Process Science, p. 423-430, 1996. (USA).

Abstract of "Need low-cost networking consider DeviceNet," W. H. Moss; InTech vol. 43:11; p. 30-31, Nov. 1996.

"Plastic Car Bodies Pass the Crash Test," mechanical engineering vol. 118, No. 12; Dec. 1996.

http://www.adeptscience.com/archive_pressroom/html/labtechnet.html; Adapt PressRoom Archives. A collection of Adept Scientific's archive news releases. "Hot Coffee on the Internet!".

When Technology Standards Become Counterproductive, Kenneth C. Crater, President, Control Technology Corporation, Hopkinton, MA dated Jul. 9, 1999, pp. 1-5.

Rockwell International Corporation, Vision & Direction, Control System Deliverables—The Next Step, pp. 1-2.

Rockwell International Corporation, Vision & Direction, Conclusion & Acknowledgments, pp. 1-2.

Rockwell International Corporation—Choices—Perspectives on the Future of Automation Control, p. 1.

Rockwell International Corporation—Allen-Bradley—Networks—Ethernet for Industrial Control—An Ethernet White Paper—Apr. 21, 1998, pp. 1-13.

Rockwell International Corporation—Automation Systems Control—General—World-Class Automation Systems from Allen-Bradley, Last Updated: May 7, 1998, pp. 1-12.

PC Quest, Dec 1997—Point, click, Control—C-Programmable controllers take the pain out of embedded control, pp. 1-2.

Berthel—automation with imagination—PCI 100—Programmable logic controller for SIMATIC/IBM IPC, pp. 1-3.

Yahoo! Personalized Search Results for programmable logic controller internet access, pp. 1-3.

Siemens—Simatic report Jan. 1997—New in the Simatic Library, pp. 1-2.

Control Magazine Aug. 1998 B Field Test—Dynamic Software Makes Control Integration Easier, pp. 1-2.

Design and Reuse Web Site—EDTN Network—Analyze IP Database Content—Analyze Reuse Blocks per taxonomy tree, pp. 1-10.

Engineering Information, Inc.—Ei CPX WEB [1990-94].

Using World Wide Web for Control Systems, F. Momal, C. Pinto-Pereira, AT Division CERN, 1211 Geneva 23, http://mish231.cern.ch/Docs/JCALEPCS/1995/icalep95.htm.

"Ethernet Base Gateway Product," AEG-Modicon, published 1991.

"Modicon Modbus Plus Network BM85 Bridge Multiplexer User's Guide," Groupe Schneider, Aug. 1995.

"Modicon Modbus Plus Network Planning and Installation Guide," AEG Schneider Automation, Apr. 1996.

"Open Modbus/TCP Specification," A. Swales, Sep. 3, 1997.

"MEB Installation and Programming Manual," Niobrara Research and Development Corporation, Sep. 24, 1997.

"MEB-TCP Installation and Programming Manual," Niobrara Research and Development Corporation, Oct. 1, 1997.

"Internet Protocol, Darpa Internet Program, Protocol Specification—RFC:791," Defense Advanced Research Projects Agency, Sep. 1981.

"Transmission Control Protocol, Darpa Internet Program, Protocol Specification—RFC:793," Defense Advanced Research Projects Agency, Sep. 1981.

"[comp.unix.programmer] Unix-Socket-FAQ For Network Programming," Vic Metcalfe, Andrew Gierth and other contributors, Jan. 22, 1998.

"TCP/IP Illustrated, vol. 2, The Implementation," Gary R. Wright, W. Richard Stevens, 1997.

"Winsock 2 Information," Bob Quinn, 1995-1998 (last updated Dec. 5, 1998).

Website Information of PROFIBUS: Technical Overview.

Website Information of ODVA—The Open DeviceNet's Vendor Association.

Website of PROFIBUS International—Welcome Page.

LabVIEW Graphical Programming for Instrumentation, Networking Reference Manual, 8 Copyright 1993, 1994 National Instruments Corporation, Part No. 320587B-01, Sep. 1994.

LabVIEW Graphical Programming for Instrumentation, Tutorial for Windows, 8 Copyright 1993, 1994 National Instruments Corporation, Part No. 320593B-01, Sep. 1994.
LabVIEW Graphical Programming for Instrumentation, Data Acquisition VI Reference Manual for Windows, 8 Copyright 1992, 1994 National Instruments Corporation, Part No. 320536B-01, Sep. 1994.
RFC 1533 "DHCP Options and BOOTP Vendor Extensions", (http://ietf.org/rfc/rfc1533.txt) IETF, Oct. 1993.
RFC 1534 "Interoperation between DHCP and BOOTP", (http://ietf.org/rfc/rfc1534.txt) IETF, Oct. 1993.
RFC 2131 "Dynamic Host configuration Protocol" ((http://ietf.org/rfc/rfc21231.txt) IETF, Mar. 1997.
SOAP, Simple Object Access Protocol (1.1) W3C Note May 8, 2000, (http://www.w3.org/TR/2000/NOTE-SOAP-20000508.
Statement of Ken Crater pertaining to awareness of LABTECHnet technology, 1 page.
*PCT Search Report for PCT/US99/05675.
*Walid Mostafa, Mukesh Singhal, "*A Taxonomy of Multicast Protocols For Internet Applications*," Jul. 18, 1997 from Computer Communications 20 (1998) 1448-1457.
*Tilo Klesper, "*Der Internet-Zugriff aufs LON*," Aug. 1998 from Automatisieren.
*David J. Preston, "*Internet Protocols Migrate to Silicon For Networking Devices*" from Electronic Design, Apr. 14, 1997.
*TIBCO Website (www.rv.tibco.com) for *TIB/Rendezvous*.
*TIBCO Software, Inc. "*TIB/Rendevous Concepts*", Release 4.1, Nov. 1997.
IEEE Std 802.11a-1999 (Supplement to IEEE Std 802.11-1999 "Part 11: Wireless LAN Medium Access Control (MAC) and Physical Layer (PHY) specifications Higher-speed Physical Layer in the 5 GHz Band" [Adopted by ISO/IEC and redesignated as ISO/IEC 8802-11:1999/Amd 1:2000(E)].
A White Paper State Language for Machine Control, Kenneth C. Crater, President, Control Technology Corporation, Hopkinton, MA dated Jul. 9, 1999, pp. 1-11.
New PC-based Process Control & Data Acquisition Software Integrates Remote Internet Capabilities with Fast Pentium Support, Fred A. Putnam, LABTECH President, pp. 1-3.
Aug. 1996 CONTROL Magazine—In The News B Electric Utility Industry Embarks on Automation Overhaul, pp. 1-10.
Jul. 1997 CONTROL Magazine B magazine Software Review B NT Package Give Plant Access Through the Web, pp. 1-3.
Oct. 1996 CONTROL Magazine B Software Review—Article Archives, pp. 1-2.
ICS Instrumentation & Control Systems B Windows NT for real-time control: Which way to go?—ICS Magazine, pp. 1-8.
I&CS Jul. 1999—Special Report Software—Software: Open source OSs, objects, Web-based communications challenge status quo, (Wayne Labs, Senior Technical Editor), pp. 24-49.
Landis & Staefa MS 2000, pp. 1-2.
Landis & Staefa Standards and Open Protocols Integration System Architecture, p. 1.
Annabooks Bookstore, Programming and Interfacing the 8051, by Sencer Yeralan and Asutosh Ahluwalia, pp. 1-2.
SoftPLC Corporation—Java Support in SoftPLC Corp. Products, pp. 1-5.
Mach J. Company, MachJ, an embeddable, clean room Java Virtual Machine, p. 1.
SoftPLC Corporation—The History of Programmable Controllers, Looking Back From the Year 2000 A.D. (Or, How Computers Replaced Proprietary PLC'S), pp. 1-7.
SoftPLC Corporation—TOPDOC: Advanced PLC program development & documentation software, pp. 1-12.
Control Engineering Online Magazine Articles (Jul. 1998)—No, that's not a PC, it's a PLC, pp. 1-2.
Rockwell International Corporation, Allen-Bradley Introduces PLC-5/80E Controller for Ethernet Communication Networks, pp. 1-2.
Rockwell Automation—Search Results, pp. 1-2.
Rockwell International Corporation, Vision & Direction, The Direction of Automation Systems, pp. 1-4.
Rockwell International Corporation, Vision & Direction, The Role of Open Systems, pp. 1-4.
Rockwell International Corporation—Vision & Direction—The Direction of Automation Systems—Emergence of Application-Specific Control Solutions, pp. 1-2.
Rockwell International Corporation—Vision & Direction—The Direction of Automation Systems—The New Factory Worker, pp. 1-2.
WWWF94'94 Information Form, Sep. 1, 1994, 3 pages.
Putnam, Frederick, "Public-domain IPC scheme moves Windows data 1000 times faster than DDE," Personal Engineering and Instrumentation News—Oct. 20, 1994, 15 pages.
1771 Control Compressor (Cat. No. 1771-DMC, -DMC1, -DMC4, and -DXPS) User Manual, Copyright 1994, Allen-Bradley Company, Inc., Publication 1771 6.5.95-PM 865119-36, Dec. 1994.
Taylor, Ken and Trevelyan, James, "A Telerobot On the World Wide Web," Proceedings of the 1995 National Conference of the Australian Robot Association, Melbourne, Jul. 5-7, 1995, Sydney: Australian Robot Association, Inc., pp. 108-118.
Article entitled, "LABTECHnet Frequently Asked Questions Updated Sep. 6, 1995," 3 pages.
Strauss, Richard, three page memo to LABTECH staff, with attached press release—For Release on Sep. 13, 1995 entitled, "Internet Goes Real-time with LAHBTECHnet," 3 pages.
Kao, James T, "Remote Microscope for Inspection of Integrated Circuits," MIT Masters Thesis; Sep. 1995, pp. 1-113.
Taylor, Ken and Trevelyan, James, "Australian Telerobot On the Web," 26th International Symposium on Industrial Robots, Oct. 4-6, 1995, pp. 40-44.
Putnam, Frederick, "LABTECHnet Visualization of a Weather Front," Oct. 15, 1995, 4 pages.
Putnam, Fredrick, "LABTECH News: Another superlative PR article!!!.," Oct. 26, 1995, 2 pages.
Soreide, N.N. et al., "Mosaic access to real-time data from the TOGA-TAO array of moored buoys," Computer Networks and ISDN Systems, Dec. 1995.
Disk Drive with Embedded Hyper-Text Markup Language Server (IBM Technical Disclosure Bulletin: Dec. 1995) [online]. Retrieved using Internet: <URL:http://www.delphion.com/tdbs/tdb?o~95A%2062530>.
EDN Access for Design, By Design—Test & Measurement Jun. 6, 1996 [online]. Retrieved from EDN—Jun. 6, 1996 Test & measurement using Internet: <URL: http://archives.e-insite.net/archives/ednmag/reg/1996/060696/12prod4.htm>.
Peryt, M. and Momal, F., "Generic Respository and Search Engine For LHC Equipment Test Data," International Conference on Accelerator and Large Experimental Physics Control Systems, 1999, Trieste, Jul., pp. 493-495.
Putnam, Frederick A., "Internet-Based Data Acquisition and Control" Sensors; Nov. 1999, pp. 1-5.
Goldberg, Ken et al; "Beyond the Web: Excavating the Real World Via Mosaic" [online], [retrieved on Apr. 3, 2001]. Retrieved from Beyond the Web Conference Paper using Internet: <URL: http://www.ncsa.uiuc.edu/SDG/IT9...golberg.html>.
The "Only" Coke Machine on the Internet [online], [retrieved on Apr. 10, 2001]. Retrieved using Internet: URL:http://www.cs.cmu.edu/~coke/history_long.txt>.
CD-ROM's in the Microwave—What do you do [online], [Retrieved on Jun. 20, 2001]. Retrieved using Internet: <URL:http://www.hamjudo.com/notes/cdrom.html>.
Welcome to Paul Haas's web server—Welcome to a historic website [online], [retrieved on Jun. 20, 2001]. Retrieved using Internet: URL:http://www.hamjudo.com/notes/cdrom.html>.
Status of Paul's (Extra) Refrigerator at Wed Jun. 20 14:32:09 EDT 2001 [online], [retrieved on Jun. 20, 2001]. Retrieved using Internet: URL:http://www.hamjudo.com/cgi-bin/refrigerator>.
Soda Can platform [online], [retrieved on Jun. 20, 2001]. Retrieved using Internet: URL:http://www.hamjudo.com/notes/soda_platform.html>.
Tub status as of Wed Jun. 20 14:44:54 EDT 2001 [online], [retrieved on Jun. 20, 2001]. Retrieved from Paul's Hottub status using Internet: <URL:http://hamjudo.com/cgi-bin/hottub>.

Frequently asked questions about Paul's Hottub [online], [retrieved on Jun. 20, 2001]. Retrieved from hottub notes and sources using Internet: <URL:http://hamjudo.com/hottub-notes.html>.

The Cal Poly Computer Society's Robotics Resources Page [online], [retrieved on Jun. 20, 2001]. Retrieved from Computer Society Robotics Resources Page using Internet: URL:http://www.elec.calpoly.edu/clubs/cs/www/RoboContest>.

News—aX announces Support for Opto 22 Ethernet B3000 Devices—Sep. 13, 2001 [online]. Retrieved from automationX using Internet: <URL:http://www.mnrcan.com/newsdetail.phtml?idno=25>.

Miscellaneous Web pages and documents from LABTECH High Performance Data Acquisition & Process Control Software—20 Years of Industry Innovation in Real-time PC Measurement and Control [online], [retrieved Sep. 18, 2001] Retrieved from LABTECH—20 Years of Industry Innovation in . . . using Interenet: <URL: http://www.labtech.com>.

The Trojan Room Coffee Machine [online], [retrieved on Sep. 19, 2001]. Retrieved using Internet: <URL:http://www.cl.cam.ac.uk/coffee/coffee.html>.

Stafford-Fraser, Quentin, "The Trojan Room Coffee Pot A (non-technical) biography" [online], [retrieved on Sep. 19, 2001]. Retrieved using Internet: <URL:http://www.cl.cam.ac.uk/coffee/qsf/coffee.html>.

Stafford-Fraser, Quentin, "The Story of the Trojan Room Coffee Pot A Timeline" [online] [retrieved on Sep. 19, 2001]. Retrieved using Internet: <URL:http://www.cl.cam.ac.uk/coffee/qsf/timeline.html>.

From Web Server to Railroad Layout Interactive Model Railroad [online], [retrieved on Sep. 19, 2001]. Retrieved using Internet: <URL:http://rr-vs.informatik.uni-ulm.de/rr/LayoutControl.html>.

News Interactive Model Railroad [online], [retrieved on Sep. 19, 2001]. Retrieved using Internet: <URL:http://rr-vs.informatik.uni-ulm.de/rr/WhatsNew.html>.

Frequently Asked Questions Interactive Model Railroad [online], [retrieved on Sep. 19, 2001]. Retrieved using Internet [URL:http://rr-vs.informatik.uni-ulm.de/rr/FAQ.html].

Stafford-Fraser, Quentin, "The Life and Times of the First Web Cam—When convenience was the mother of invention", [online], [retrieved on Sep. 19, 2001]. Retrieved using Internet: <URL:http://www.cl.cam.ac.uk/coffee/qsf/CACM200107.html>.

aX Process Control [online], [retrieved on Sep. 24, 2001]. Retrieved from automationX Process Control using Internet: <URL:http://www.mnrcan.com/ProcessControl.phtml>.

Goldberg, Ken and MASCHA, Michael, "Mercury Project Aug. 1994-Mar. 1995," [online], [retrieved on Sep. 2001]. Retrieved using <URL:http://www.usc/edu/dept/raiders>.

Momal, F., et al., "A Control System based on Industrial Components for Measuring and Testing the Prototype Magnets for LHC," [online], [retrieved on Oct. 9, 2001]. Retrieved from A Industrial Control System for Testing the Magnets for LHC using Internet: <URL: http://mish231.cern.ch/Docs/CS/blC.html>.

Bradford Robotic Telescope—Intro [online], [retrieved on Nov. 15, 2001]. Retrieved from Introduction to the Bradford Telescope using Internet: <URL:http://www.telescope.org/rti/intro.html>.

Xavier has a new job! [online], [retrieved on Nov. 15, 2001]. Retrieved using Internet: URL:http://www-2.cs.cmu.edu/Groups/xavier/www>.

Bibliography [online], [retrieved on Nov. 16, 2001] Retrieved from Xavier Papers using Internet: <URL:http://www-2.cs.cmu.edu/Groups/xavier/www/papers/html>.

Web page retrieved on Nov. 16, 2001. Retrieved using Internet: <URL:http://www.awe.com/mark/wwwf94/coxfig3.gif>.

Cox, Mark and Baruch, John, "Robotic Telescopes: An Interactive Exhibit on the World-Wide Web," [online]. [retrieved on Nov. 16, 2001]. Retrieved from Robotic Telescopes Paper using Internet: URL:http://www.awe.com/mark/wwwf94/wwf94.html>.

About LabCam [online], [retrieved on Nov. 28, 2001] Retrieved using Internet: <URL:http://people.cs.uchicago.edu/~peterp/LabCam/aboutLabCam.html>.

Scharf, Ronald et al, "Using Mosaic for Remote Test System Control Supports Distributed Engineering" [online], [retrieved on Oct. 21, 2003]. Retrieved using Internet: <URL:http://archive:ncsa.uici.edu/SDG/it94/Proceedings/CSCW/scharf/scharf.html>.

Article entitled, "Installing and Using LABTECHnet," 2 pages, undated.

* cited by examiner

FIG. 13

| A_PDU HEADER | FAULT INDICATION | ACCELERATOR | MNGT LENGTH | DATA IDENT. | INDEX | DATA |
|---|---|---|---|---|---|---|
| XX XX 01 00 00 10 | 00 | 80 10 00 00 00 | 00 04 | 01 20 | 00 06 | 02 12 34 01 |

50

| A_PDU HEADER | FAULT INDICATION | ACCELERATOR | MNGT LENGTH | DATA 1 IDENT. | INDEX 1 | DATA 1 | DATA 2 IDENT. | INDEX 2 | DATA 2 |
|---|---|---|---|---|---|---|---|---|---|
| XX XX 01 00 00 18 | 00 | 80 10 00 00 00 | 00 08 | 01 20 | 00 0A | 01 21 | 00 06 | 02 12 34 01 | 02 56 78 01 |

52

| A_PDU HEADER | FAULT INDICATION | ACCELERATOR | MNGT LENGTH | DATA IDENT. | INDEX | DATA |
|---|---|---|---|---|---|---|
| XX XX 01 00 00 10 | 00 | 20 00 00 00 00 | 00 04 | 00 07 | 00 06 | 02 12 34 01 |

54

| A_PDU HEADER | FAULT INDICATION | ACCELERATOR | MNGT LENGTH | DATA 1 IDENT. | INDEX 1 | DATA 1 | DATA 2 IDENT. | INDEX 2 | DATA 2 |
|---|---|---|---|---|---|---|---|---|---|
| XX XX 01 00 00 18 | 00 | 20 00 00 00 00 | 00 08 | 00 07 | 00 0A | 02 07 | 00 0E | 02 12 34 01 | 02 56 78 01 |

56

| A_PDU HEADER | FAULT INDICATION | ACCELERATOR | MNGT LENGTH | DATA IDENT. | INDEX | DATA |
|---|---|---|---|---|---|---|
| XX XX 01 00 00 10 | 00 | 02 00 00 00 00 | 00 04 | A0 00 | 00 06 | 02 12 34 01 |

58

| A_PDU HEADER | FAULT INDICATION | ACCELERATOR | MNGT LENGTH | DATA 1 IDENT. | INDEX 1 | DATA 1 | DATA 2 IDENT. | INDEX 2 | DATA 2 |
|---|---|---|---|---|---|---|---|---|---|
| XX XX 01 00 00 18 | 00 | 02 00 00 00 00 | 00 08 | A0 00 | 00 0A | A0 01 | 00 0E | 02 12 34 01 | 02 56 78 01 |

60

| A_PDU HEADER | FAULT INDICATION | ACCELERATOR | MNGT LENGTH | DATA IDENT. | INDEX | DATA |
|---|---|---|---|---|---|---|
| XX XX 01 00 00 16 | 00 | 04 00 00 00 00 | 00 04 | 80 20 | 00 0A | 08 12 34 56 78 9A BC DE F0 01 |

62

| A_PDU HEADER | FAULT INDICATION | ACCELERATOR | MNGT LENGTH | DATA 1 IDENT. | INDEX 1 | DATA 1 | DATA 2 IDENT. | INDEX 2 | DATA 2 |
|---|---|---|---|---|---|---|---|---|---|
| XX XX 01 00 00 18 | 00 | 04 00 00 00 00 | 00 08 | 80 20 | 00 0A | 81 20 | 00 0E | 02 12 34 01 | 02 56 78 01 |

82

COMMUNICATION SYSTEM FOR A CONTROL SYSTEM OVER ETHERNET AND IP NETWORKS

RELATED APPLICATIONS

This patent application is a continuation application of pending U.S. patent application Ser. No. 09/623,689 filed Sep. 6, 2000; which is a U.S. national filing of PCT Patent Application PCT/US99/05675, filed Mar. 15, 1999; which claims the benefit of U.S. Provisional Patent Application Ser. No. 60/078,223, filed Mar. 16, 1998. These applications are incorporated herein by reference.

TECHNICAL FIELD

The present invention generally relates to an industrial automation system for monitoring and controlling field devices within a distributed digital control system. More specifically, the present invention relates to communication networks and protocols for real time communication between and among simple devices, intelligent devices, as well as other devices.

BACKGROUND

The use of Ethernet-Internet Protocol (IP) networks is very large within applications in the Information Technology filed. Up to now, in industrial control and automation applications, Ethernet-IP networks have been used mainly to transfer non time-critical information.

For example, although the LIP Ventera range of products uses a publisher/subscriber relationship integrated in the Tibco protocol, the HP Ventura is not optimized for real time automation applications, e.g. not providing any timeliness of published data.

SUMMARY OF THE INVENTION

The present invention is a Distributed Data solution for industrial control over Ethernet-IP networks. The purpose of this invention is to provide means to transfer over an Ethernet-IP network time-critical information between devices participating in a large industrial control or automation solution. Known technology includes the Client/Server relationship using Modbus (PI-MBUS-300) or other traditional messaging application layer protocol. The present invention, by using publisher/subscriber relationship, IP multicasting and broadcasting solutions, and data validation means using timeliness statuses, provides better performance, low cost of devices using this solution, as well as capability for direct communication between devices. Moreover, performance achieved with this solution answers the needs of the most demanding real-time automation applications. In addition, the simplicity of the solution provides capability to integrate it in simple and low cost devices. Furthermore, direct communication between devices reduces the cost of the global application.

This present invention can, therefore, be used in all applications where traditional device buses or fieldbuses are used today (for example, DeviceNet, ControlNet, Fieldbus Foundation, Profibus, Modbus+, Word1FIP, Interbus-S, etc.). Applications of the present invention can include, for example, Industrial Control, Automation, Process Control, Electrical Distribution, Building Automation, and other applications.

In accordance with the present invention, a communication system is provided for communication within a control system. The communication system has a plurality of simple devices connected to an intra-level communications network, each simple device being adapted to directly exchange data with the other simple devices. The communications system also has at least one intelligent device connected to the intra-level communications network, each intelligent device being adapted to directly exchange data with each simple device on the intra-level communications network. The communication system can have a plurality of intra-level communications networks. The intra-level communications networks can be directly connected by an intra-level core connector or by an inter-level core connector through an inter-level network of the intelligent devices.

Other advantages and aspects of the present invention will become apparent upon reading the following description of the drawings and detailed description of the invention.

BRIEF DESCRIPTION OF THE DRAWINGS

FIG. 13 depicts examples of published data frames of the present invention.

DETAILED DESCRIPTION

Figure 2:
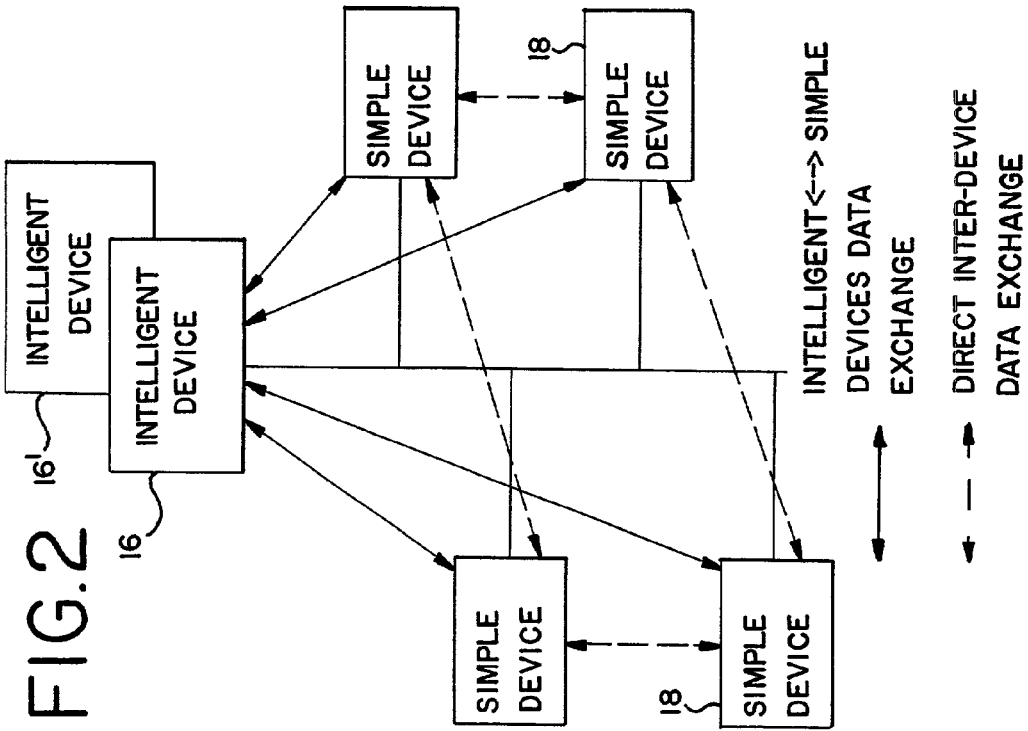
FIG. 2 is a block diagram of the intra-level communications network of FIG. 1 having multiple intelligent devices therein.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

With reference to the Figures, Ethernet can be used as a device level 1 network (referred to herein as a Ethernet level 1 core) which can include sensor buses and focuses on the need to sample the physical manufacturing environment and to provide real-time data samples to a control level for decision making. Messaging application layer services, such as provided by Modbus, above the internet secured tranport layer-internet network layer (TCP-IP) can be use as a basic solution. For the most demanding applications with high performance requirements, other solutions have been studied and evaluated. The real time distributed data base (RTDDB) solution, using multicasting capabilities of the internet user datagram protocol (UDP) transport layer, makes the best possible use of the Ethernet with high performance. It can be used in addition to, for example, Modbus.

For reference, the following is a glossary of terms used herein: (1) Modbus is a messaging application layer (Read/Write services) used as a basic applicative solution and also used for RTDDB configuration; (2) RTDDB is a new application layer services and protocol specified by the present specification providing efficient communication on Ethernet level 1 network using UDP multicasting capabilities; (3) Agents are network management configured devices; (4) a Manager is a device providing network management configuration to agents; (5) Simple devices usually are directly connected to the process (e.g. to perform measurements, input acquisition, to provide outputs, and the like) They also are agent devices. Examples are input/output (I/O) devices, drives and motor control centers (MCCs); (6) Intelligent devices are programmable. They may be managers. Examples are personal computers (PCs), programable logic controllers (PLCs), specialized programmable devices, Hub Machine Interfaces (HMIs) and gateways; Messaging exchanges are other non RTDDB exchanges in system; (7) Refreshment status is associated with a data sent by a device on the network. It indicates that the data publisher is functioning. Refreshment is useful when communication still cyclically sends data on the network even if the data itself is invalid, because the data publisher is not functioning. Refreshment can use for example a timer, which is set each time the publisher writes data in the communication part of the device and wherein refreshment is valid until the timer expires; (8) Promptness status indicates that the data read from the communication system is not too old. Promptness is useful when the application part of the device still cyclically reads data from its communication part, even if the data itself is invalid, because the network is not functioning. Promptness status uses a timer, which is set each time the network writes data in the communication part of the device and wherein promptness is valid until the timer expires.

On Ethernet level 1 core network, the RTDDB solution is designed to fulfill following needs: intra-level 1 communications (e.g. used for distributed I/Os) and inter-level 1 communications (e.g. used for data exchanges between PCs, PLCs, and the like).

RTDDB communications can be mixed on the same Ethernet physical network, or can be separated depending on the application size and performance. RTDDB communications can also be mixed with, for example, Modbus communications.

Figure 1:
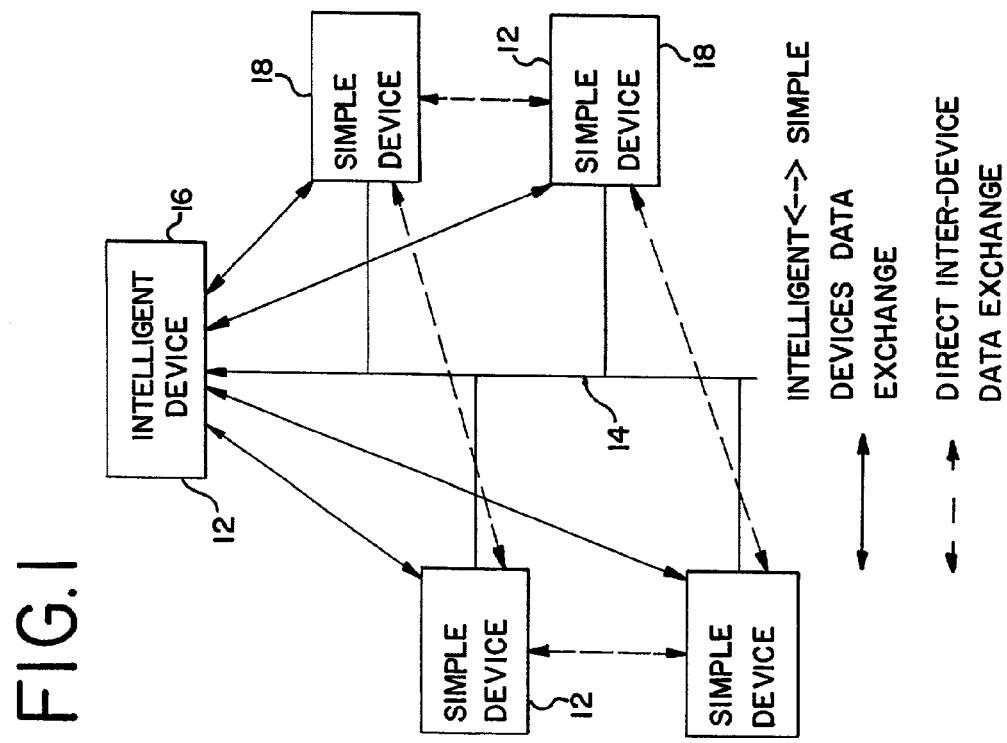
FIG. 1 is a block diagram of an intra-level communications network of the present invention.

Referring to FIG. 1 an example of intra-level communications is depicted. In an embodiment the number of devices 12 on the network 14 is typically between 10 and 50 with a maximum number under 256. The intelligent device 16 on the network sends cyclically to the simple devices 18 commands and the status of simple device outputs. Correspondingly, the simple devices 18 send back to the manager inputs, status, and other information as soon as a change occurs, on event and/or cyclic back-up. Direct communication between devices can also be provided (e.g., synchronization and clock). Intelligent devices can also participate in this direct communication.

Desirably, all RTDDB exchanges have high performance requirements. In an embodiment, the response time from one input change on any device to the corresponding output change on another device is preferred to be around a few ten milliseconds (ms), including input and output device processing, intelligent device processing and network exchanges wherein: processing delays inside simple devices may be a few ms; intelligent devices like PLCs use periodic task, with 15 ms typical period for fastest tasks; network delays may be a few ms, if Ethernet is not overloaded. Moreover, synchronization within this embodiment between output changes on several devices corresponding to one event is preferred to be around a few ms. Clock distribution within this embodiment provides capability for local event datation in devices with a 1 ms accuracy. This is especially useful in electrical distribution systems where each device has an accurate clock, synchronized by the network distributed clock, used for local time-stamping of events, which are afterwards centralized for discrimination and edition.

Referring to FIG. 2, redundant intelligent devices 16,16' can be used in another embodiment of an intra-level communications network. However, in this embodiment only one intelligent device is active at once, and sends commands to the simple devices 18, while other intelligent devices listen to traffic coming from agents.

Figure 3:
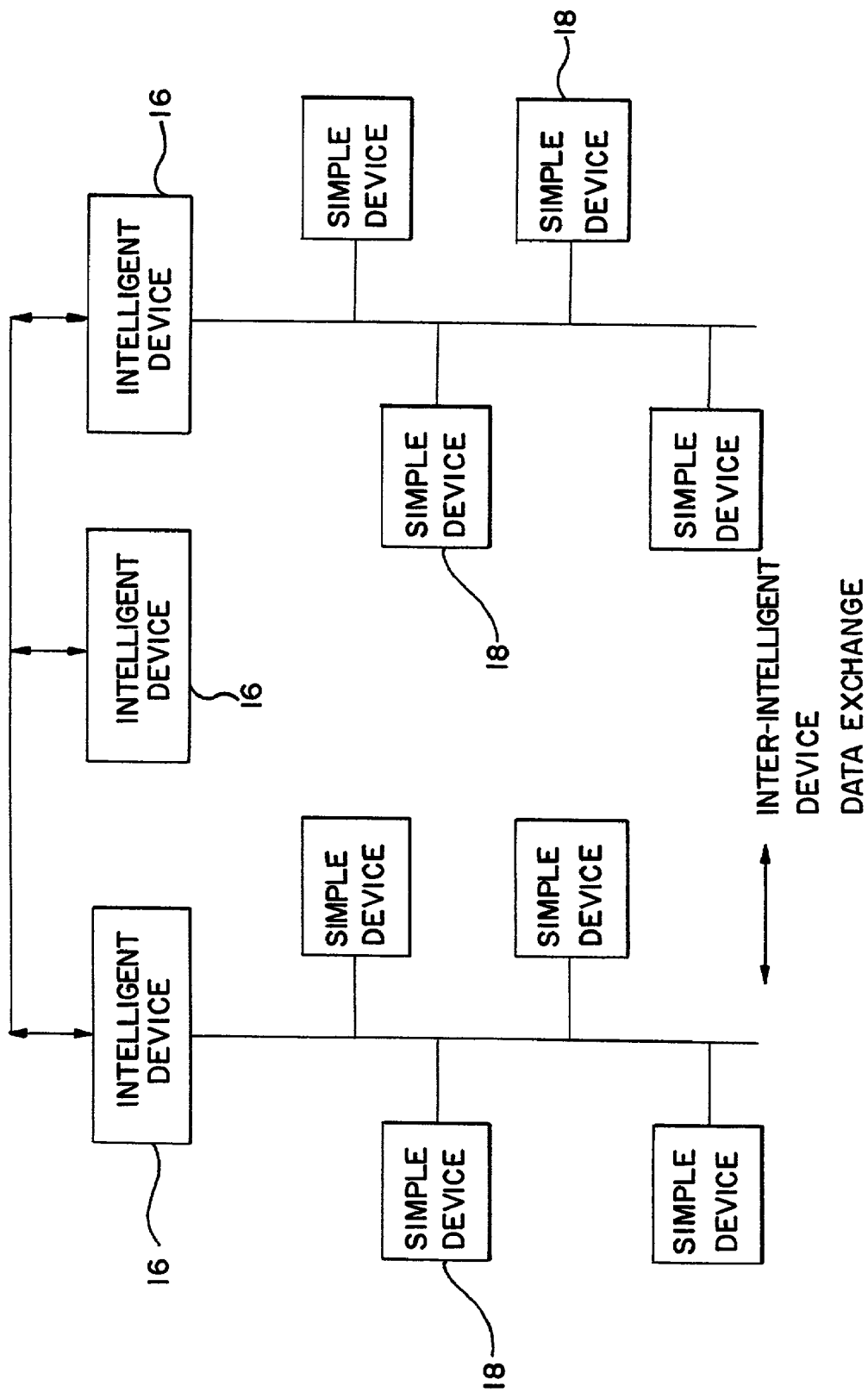
FIG. 3 is a block diagram of an inter-level communications network of the present invention.

Referring to FIG. 3, in an embodiment each intelligent device 16 can have a cluster of up to 256 devices (including intelligent device), exchanging between them inter-level 1 communications. As indicated above, the intelligent devices 16 can be redundant. In a preferred embodiment, the typical number of intelligent devices 16 is between 4 and 16 with the maximum number being under 256.

Figure 4:
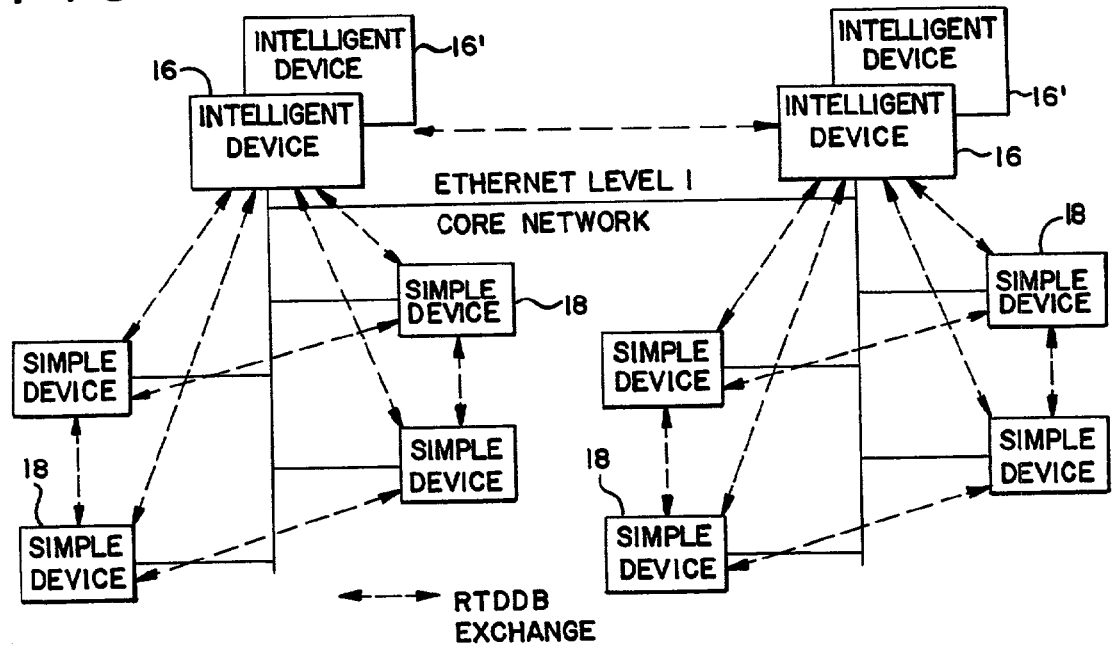
FIG. 4 is a block diagram of multiple intra-level communications networks connected through an intra-level core connection of the present invention.

In the embodiment shown in FIG. 4, each intelligent device 16 sends cyclically to all other intelligent devices application data (e.g. used for synchronization between applicative tasks). The performance requirements are not so high as for inter-level 1 communications. It has been observed that typically, each intelligent device 16 will send 8 bytes of data every 40 ms, in systems having up to 32 intelligent devices.

Figure 5:
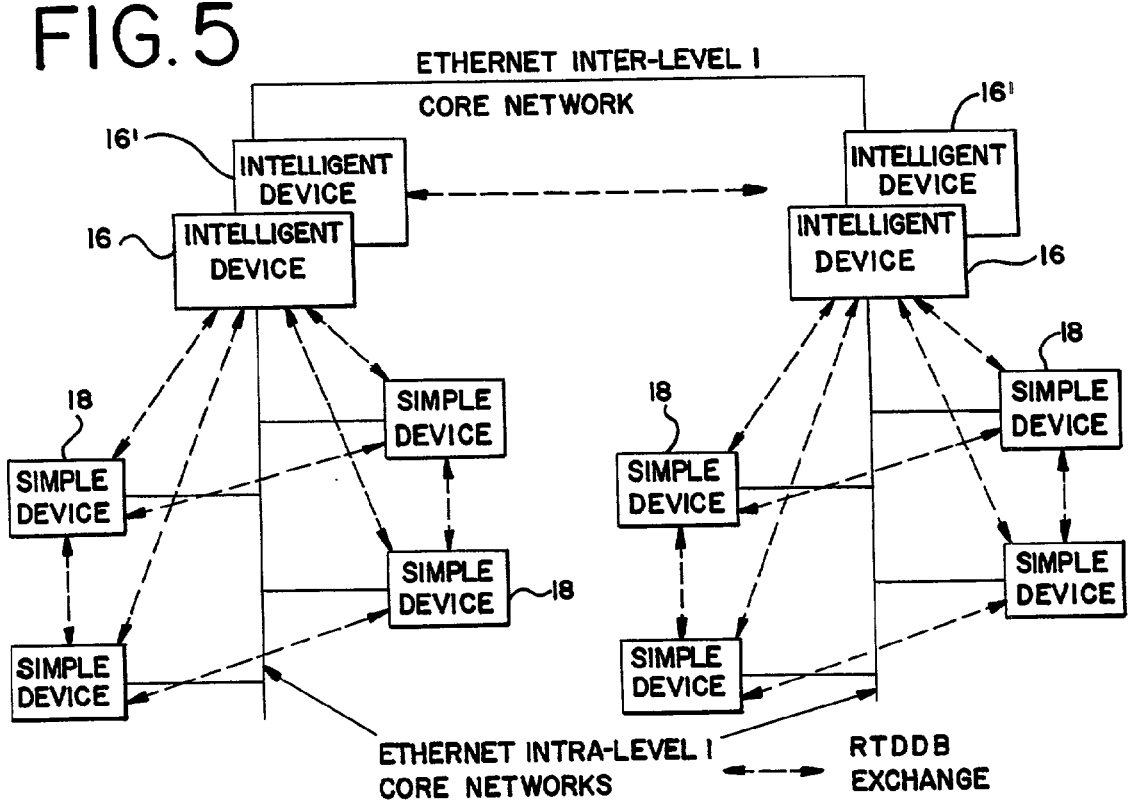
FIG. 5 is a block diagram of multiple intra-level communications networks connected through an inter-level core connection of the present invention.

Referring to FIG. 4, RTDDB intra and inter-level 1 communications can be mixed on the same Ethernet physical network. In addition, referring to FIG. 5, they can also be separated on different physical networks, as shown, wherein the choice is made taking into account application size and performance. It should be understood that in either cases, there is no RTDDB communications between simple devices of different clusters.

Figure 6:
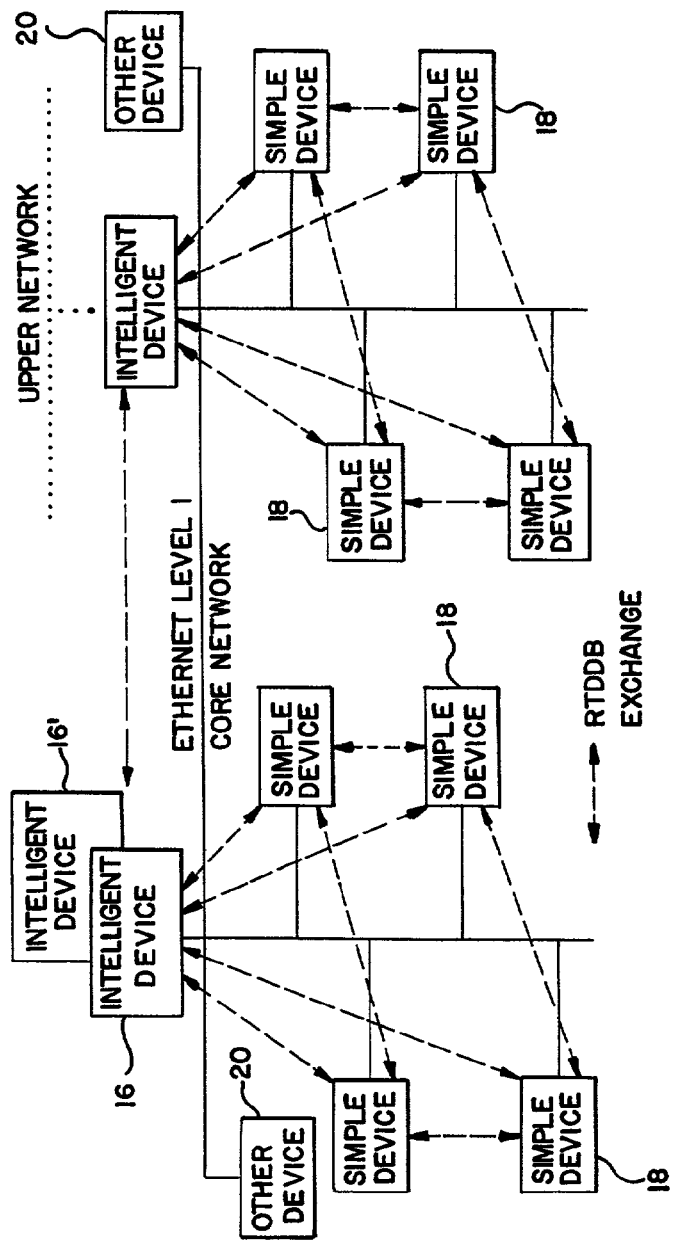
FIG. 6 is a block diagram of multiple intra-level communications networks connected through an intra-level core connection, depicting additional connections to other devices and networks of the present invention.

Referring to FIG. 6, RTDDB and Modbus communications can be mixed on the same Ethernet physical network along with any kind of other device. In this embodiment, messaging exchanges (Modbus) are not part of the RTDDB exchanges. Messaging exchanges are performed between any device in the networks, including: (1) exchanges with other devices 20 not participating in the RTDDB system, located on the level 1 network or on upper networks; and (2) other exchanges with simple 18 or intelligent devices 16 (e.g. for configuration and the like)

Figure 7:
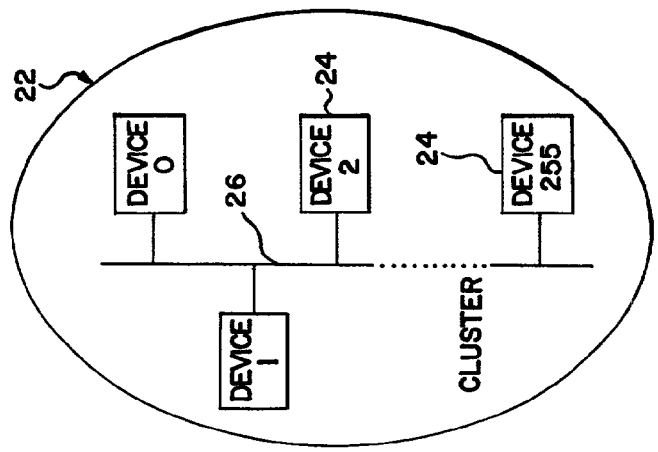
FIG. 7 is a block diagram of real time distributed data base (RTDDB) connections of devices on a single cluster of the present invention.

Referring to FIG. 7, within a preferred embodiment of a RTDDB system, clusters 22 (only one cluster shown) of up to 256 devices 24 can be defined. Each cluster 22 can contain any types of devices (Intelligent and/or simple). Multiple clusters are possible inside one RTDDB system, and some intelligent devices can belong to several clusters. As stated above, it should be understood that there is no RTDDB communication between devices of different clusters.

Inside each cluster 22, each device 24 publishes RTDDB frames. Frames are published either cyclically or when a change or an event occurs, at the publisher initiative. Frames are sent on the Ethernet network 26, using UDP and IP. Each frame may be sent to one device (using individual IP address), to a group of devices inside a cluster (using group IP multicast address), or to the cluster (using cluster IP multicast address). Groups can be dynamically defined.

In an embodiment, each frame contains one or several data and each device 22 subscribes to data it is interested in. The device in the cluster 22 are individually identified by a logical identification and each data is referenced. Means are also provided for a simple device to know very fast when a frame contains data which it is interested in. A RTDDB frame also contains a fault indication indicating when a fault occurs in the publisher. Each data has an associated refreshment status for indicating the state of the corresponding data producing part of the publisher and each subscriber can also control promptness of received data.

As described above, the RTDDB system can be used to answer intra-level 1 needs wherein the intelligent device (or the active intelligent device in a redundant system) cyclically multicasts a frame which contains individual data (commands, outputs) for a group of simple devices, using their group IP multicast address. The group is defined freely by the intelligent device, taking into account frame size limit.

Each of the simple devices decodes received valid multicast frames to extract data which has been addressed to it. For each data, the simple device controls its refreshment status and sets a promptness timer. When the refreshment status is false or when the timer times-out, the subscriber may enter in a specific operating mode (e.g. set outputs in fallback position).

Similarly, each simple device sends to the intelligent device(s) its published data (e.g., inputs, measures, and the like), using intelligent device IP address (which can be an individual address if there is only one intelligent device or a multicast address if redundant intelligent devices are used). Each simple device can also multicast on the network direct inter-device communication data, using the cluster IP multicast address. Each simple device published data can be sent when a change or an event occurs (e.g. on a digital input change), with a minimum inter-sending period, and/or cyclically. For example, a digital I/O device sends its input values when a change occurs, with a minimum inter-sending period of 10 ms, and cyclically for back-up every 100 ms. In another example, a drive sends the motor speed every 100 ms.

It should be noted that other addresses like sub-network broadcast address which are addressing more devices can be used (if only one cluster is used in the system), but should be used with careful attention because of potential performance impact due to all devices on the network receiving all sub-network broadcast frames and decoding them in software to know if they are interested in each frame. Using specific individual or multicast addresses is preferred because most of the non-interesting frames are filtered by the Ethernet component.

It should also be noted that simple device event driven sending is preferred to cyclic sending as the nominal solution whenever possible because it provides the best possible use of the Ethernet which was designed for event driven transmissions and the fastest response times.

Also as described above, the RTTDB system answers inter-level 1 needs wherein each intelligent device cyclically multicasts a frame which contains application data to be exchanged between intelligent devices, using intelligent device cluster IP multicast address. Each data has an associated refreshment status indicating the state of the corresponding producing part of the manager.

Figure 8:
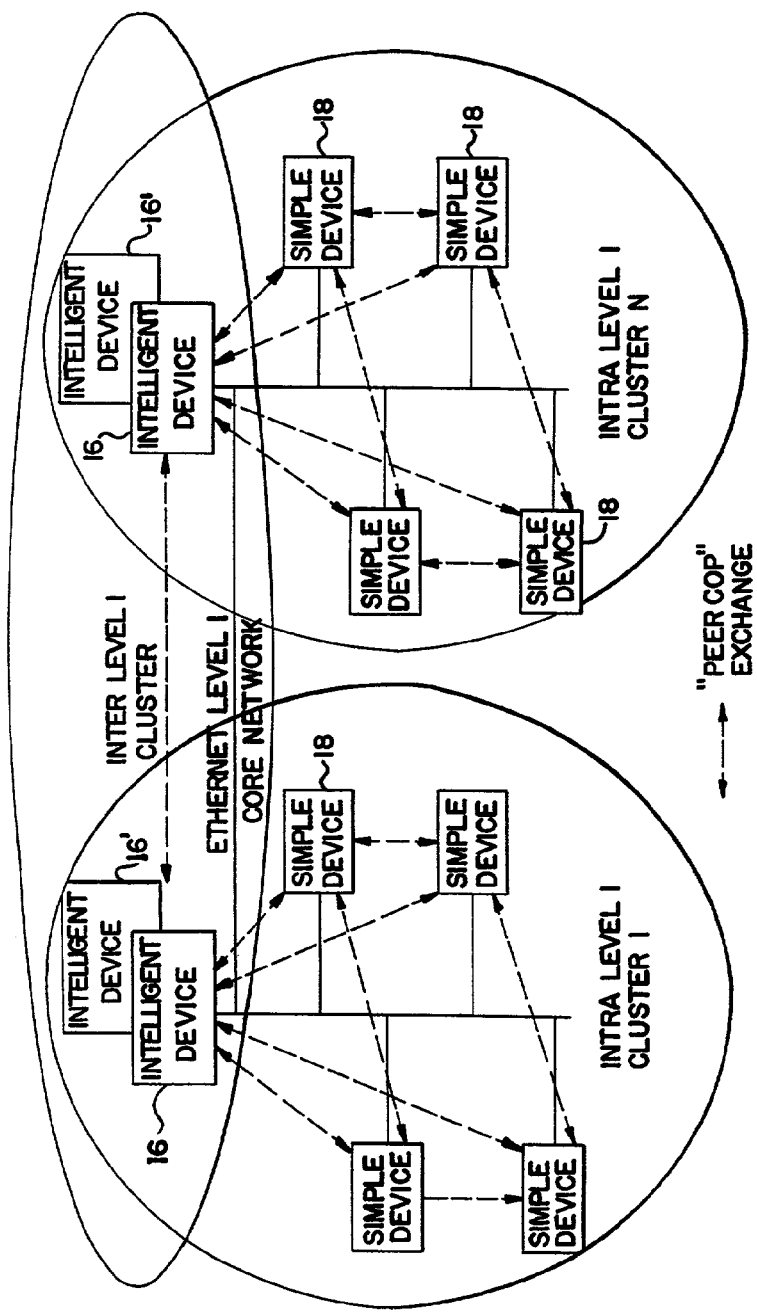
FIG. 8 is a block diagram of multiple intra-level communications networks connected through an inter-level core connection and through an intra-level core connection of the present invention.

In addition, all intelligent devices interested in this data decode it, control its refreshment status and set a promptness timer. When the refreshment status is false or when the timer times-out, the subscriber may enter in a specific operating mode (e.g. local mode). Referring to FIG. 8, this figure depicts how the RTDDB system can be used to answer needs to mix intra and inter-level 1 communications (as described above).

The preferred aspects of the present invention with regard to initialization, data reference, and RTDDB frame encoding are described, in detail, below. With regard to initialization at each power-up before RTDDB initialization phase, each device preferably has acquired its IP parameters comprising: IP individual address; IP sub-network mask; IP default gateway address. These IP parameters can be acquired by, for example, a Bootstrap Protocol (BOOTP) request to a BOOTP server (e.g. for simple devices) or by local means (e.g. for managers having associated programming tools, HMI). Moreover, attention should be paid to have a coherent configuration in the system (unity of IP addresses, same IP sub-network mask), especially when using local means.

Next, RTDDB configuration information should be acquired comprising: Device logical identification; IP addresses to be used; Timing information; and all data should have a 2 byte reference.

Detailed configuration information contents, as well as how they are acquired, are typically specified in the product specification of each device. However, they are specified hereunder for the following devices: Simple devices used in intra-level 1 communications; Intelligent devices used in intra-level 1 communications; and Intelligent devices used in inter-level 1 communications.

Turning to configuration of the simple devices used in intra-level 1 communications, as soon as each simple device is ready to communicate using, for example, the Modbus protocol over TCP/IP, it waits for its manager (or a global configurator) writing significative values in RTDDB configuration registers before communicating using RTDDB protocol.

In an embodiment, the following registers can be written in each simple device, using Modbus services:

| Modbus services | Configuration registers | Offset in Hex | Size of Field |
| --- | --- | --- | --- |
| Read/Write | Logical identification | F201 | 1 word |
| Read/Write | Sending period | F202 | 1 word |
| Read/Write | Minimum inter-sending period | F203 | 1 word |
| Read/Write | Intelligent device IP address | F204–F205 | 2 words |
| Read/Write | Promptness period | F206 | 1 word |
| Read/Write | Receiving IP multicast address | F207–F208 | 2 words |
| Read/Write | Application specific registers | F209 to F3FF | Application specific |

With regard to the configuration resister, logical identification is one word at offset F201. This register can be read and written using, for example, Modbus commands, and the default value (at power up) is FF FFh (not configured for RTDDB). The significative RTDDB values are comprised between 0 and 255. As soon as a significant value is written in this register, the simple device starts using RTDDB. When other values (first byte not equal to 0) are written in this register, the simple device stops using RTDDB.

For the simple device first published data, its sending period is specified by the sending period register. Other periods for other published data can be specified in application specific registers. Preferably, the sending period is one word at offset F202. This register can be read and written using, for example, Modbus commands, and the default value (at power up) is FF FFh (no periodic broadcast). The sending period is in increments of 1 ms. Preferably, its minimum value is 5 ms.

The minimum inter-sending period for the simple device first published data is specified by the minimum inter-sending period register. Other periods for other published data can be specified in application specific registers. Minimum inter-sending period is one word at offset F203. This register can be read and written using, for example, Modbus commands, and the default value (at power up) is FF FFh (no sending on change). The minimum inter-sending period is in increments of 1 msec. Preferably, its minimum value is 10 ms.

Data are sent to the intelligent device(s) using this intelligent device IP address. The default value is the IP address of the first Modbus client of the agent (most often its manager). This value can be changed by a manager at any time. Individual address should be written in these registers, if there is no redundant intelligent device. Multicast address should be written in these registers, if redundant intelligent devices are used.

For the simple device first subscribed data its promptness period is specified by the promptness period register. Other periods for other subscribed data may be specified in application specific registers. Preferably, the promptness period is one word at offset F204. This register can be read and written using, for example, Modbus commands, and the default value (at power up) is 250 (250 ms). The promptness period is in increments of 1 ms. FF FFh value means no promptness control. Its minimum value preferably is 15 ms.

With regard to receiving IP multicast address, simple devices receive data on their own individual IP address, on the sub-network broadcast address and on the receiving IP multicast address applicable to a group of agents inside the cluster. There is no IP multicast address specified at power up. A new value can be taken into account only when RTDDB is stopped.

Turning to configuration of the intelligent devices used in intra-level 1 communications, after having acquired its IP parameters, each manager gets its configuration information, by local means (e.g. programming tools or HMI) or by requesting it to a global configurator. Desirably, the following configuration information is acquired to start RTDDB communications: (1) Intelligent device logical identification inside the intra-level 1 cluster; (2) IP addresses of the simple devices of the cluster and correspondence with their logical identifications; (3) Simple device group IP multicast addresses used to send frames to the simple device groups of the cluster; (4) Intelligent device group IP multicast address used to receive frames from the simple devices (if redundant managers are used); and (5) Cluster IP multicast address, if using direct inter-device communication.

Turning to configuration of the intelligent devices used in inter-level 1 communications, after having acquired its IP parameters, each manager gets its configuration information, by local means (e.g. programming tools or HMI) or by requesting it to a global configurator. Such configuration information preferably includes: (1) Intelligent device logical identification inside the inter-level 1 cluster; (2) Inter-level 1 IP multicast address to exchange data with other intelligent devices (default value is the sub-network broadcast address); and (3) lengths and periods of application data sent to other managers. Desirably, by default, only one application data (physical reference first byte 80h) of 8 bytes length is sent to other managers every 4 ms.

Each data inside the RTDDB system preferably has a 2 byte reference. In an embodiment, two types of reference can be used: Physical reference and logical reference. Physical reference is used where the second byte of the 2 byte reference is the device logical identification of one of the devices participating in the exchange. The first byte of the reference indicates which device data is addressed. Data syntax and semantic are specified by the device specification. Physical reference is very useful in the following exchanges, where this reference type provides automatic data reference configuration, as soon as device logical identifications are configured: (1) exchange with a simple device (e.g. data sent or received by a simple device), in which data can be sub-classified in applicative data (I/O values, measurements, commands, and the like) and system data (configuration, parameters, status, default, and the like); (2) data sent by an intelligent device to other intelligent devices.

Logical reference is where there is no reference to any device logical identification. Logical reference sub-types are defined as universal logical reference and dynamically assigned logical reference.

Universal logical reference is where data reference, syntax and semantic are specified by the present specification. This type of reference is useful for data which may be used in every systems (e.g., clock and the like). Dynamically assigned logical reference is where any means can be used to assign reference to data, which can be of any type.

The following table specifies range of values reserved for each reference type:

| Reference type | First byte | Second byte | Use | Use example |
| --- | --- | --- | --- | --- |
| Physical reference | 01h to 3Fh odd values | Simple device logical identification | Applicative data sent to a simple device | Intelligent device --> Simple device in intra-level 1 communication |
| | 41h to 7Fh odd values | Simple device logical identification | System data sent to a simple device | Intelligent device --> Simple device in intra-level 1 communication |
| | 00h to 3Eh even values | Simple device logical identification | Applicative data sent by a simple device | Simple device --> Intelligent device in intra-level 1 communication |
| | 40h to 7Eh even values | Simple device logical identification | System data sent by a simple device | Simple device --> Intelligent device in intra-level 1 communication |

-continued

| Reference type | First byte | Second byte | Use | Use example |
|---|---|---|---|---|
| | 80h to 8Fh | Intelligent device logical identification | Data sent by an intelligent device | Intelligent device --> Intelligent devices in inter-level 1 communication |
| Logical reference | 9000h to 9FFFh | 9000h to 9FFFh | Data with universal reference (clock . . . ) | Direct inter-device communication in intra or inter-level 1 communication |
| Logical reference | A000h to FFFFh | A000h to FFFFh | Data with dynamically assigned reference | Any communication |

It should be noted that different data inside a cluster should have different data reference. Same data reference can be used for data of different clusters inside a RTDDB system.

Turning to the subject of RTDDB frame encoding, each device can publish RTDDB frames that are sent on the Ethernet network using UDP and IP. The frames are published either cyclically or when a change or an event occurs. Each frame can be sent to one device using individual IP address, to a group of devices using inside the network segment using group IP multicast address, or to the network segment using sub-network IP broadcast address. Further, groups can be dynamically defined.

As indicated above, each frame contains one or several data and each device subscribes to data it is interested in. Moreover, each device on the network segment is preferably identified by a logical identification and each data is referenced.

A fault indication is provided by each frame for indicating when a fault occurs in the publisher. Furthermore, each data has an associated refreshment status, which can indicate the state of the corresponding data producing part of the publisher. Each subscriber can control promptness of received data.

A network manager, using messaging services or other communication services makes an RTDDB configuration of each device. RTDDB configuration includes device logical identifications, data references, timing information and IP multicast addresses. Preferably, all devices participating in the RTDDB system have the same IP sub-network address. Also, it is desirable that no router be used inside the RTDDB system.

Figure 9:
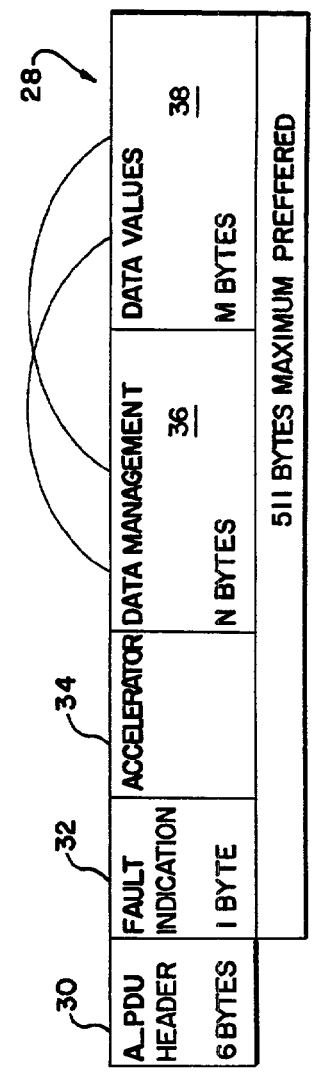
FIG. 9 is a RTDDB data frame encoding layout in accordance with the present invention.

Turning to FIG. 9, the application part 28 of the published frame is composed of five different fields: (1) A_PDU header 30; (2) Fault Indication 32; (3) Accelerator 34; (4) Data management field 36; (5) and Data value field 38.

Figure 10:
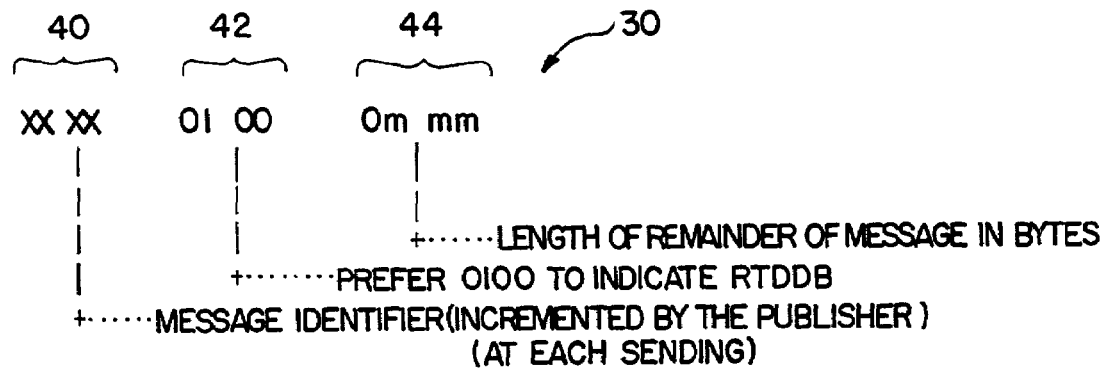
FIG. 10 is an A_PDU header layout for the RTDDB data frame encoding layout of FIG. 9.

FIG. 10 shows the preferred embodiment of A_PDU header 30 having a message indicator 40, RTDDB indicator 42, and message length indicator 44.

Regarding fault indication, each frame contains a fault indication indicating when a fault occurs in the publisher device. A value different from 0 indicates a fault. The encoding of this byte is application specific. This indication can be used to indicate very fast to other devices participating in the application that a fault occurs (e.g. fast indication of a watch-dog fault in a simple device, sent to the intelligent device, or fast indication of an intelligent device in local mode, sent to other intelligent devices).

The accelerator field 34 is used to provide capability to know very fast and easily if data may be addressed to a device in the rest of the frame. This accelerator is especially useful in simple devices. This field is preferably a 5 byte synthesis of all the data references included in the frame:

| Data reference types 1 byte | Simple device logical references 4 bytes |
|---|---|

The first byte, Data reference types, is a string of 8 bits indicating with types of data references are used in the frame, based on the first byte of each data reference:

| Bits set to 1 in data reference types byte | Indicating that at least one data reference first byte has a value: |
|---|---|
| Bit7 | 01h to 3Fh odd values |
| Bit6 | 41h to 7Fh odd values |
| Bit5 | 00h to 3Eh even values |
| Bit4 | 40h to 7Eh even values |
| Bit3 | 80h to 8Fh |
| Bit2 | 90h to 9Fh |
| Bit1 | A0h to FFh |

Bit0 is set to 0.

Figure 11:
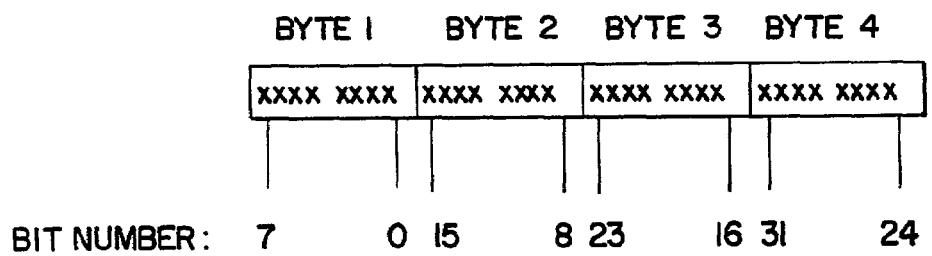
FIG. 11 depicts the simple device logical references of an accelerator.

If bit7 or bit6 of previous byte is set to 1, the four following bytes (byte1 to byte4 shown in FIG. 11) are a string of 32 bits, indicating which logical identification group are addressed (corresponding bits are set to 1). For example, bit0 indicates that at least one device having logical identification 0 to 7 is addressed, bit1 indicates that at least one device having logical identification 8 to 15 is addressed, . . . bit31 indicated that at least one device having logical identification 248 to 255 is addressed. If bit7 and bit6 of previous byte are set to 0, byte1 to byte 4 are set to 0.

Figure 12:
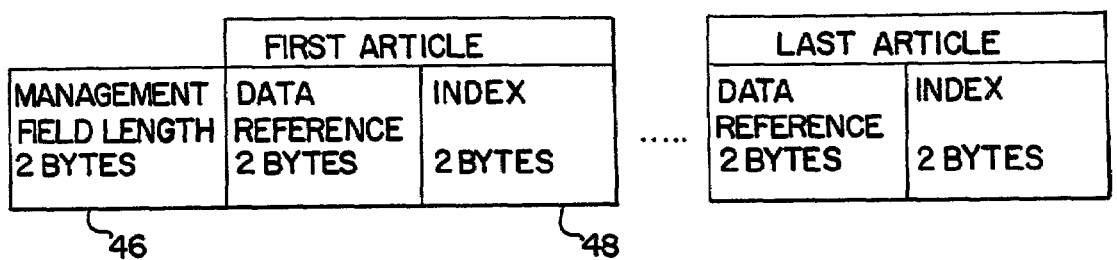
FIG. 12 is a layout of the data management of the present invention.

The data management field preferably has the structure identified in FIG. 12. The management field length 46 gives the length of the remainder of the data management field in bytes. For each data, an index (2 bytes word 48) gives the position of the data value: This is the byte number since the beginning of the data management field and before the first data byte (not included).

Preferably, each data has the following structure: n d1. . . . dn rf, wherein n equals the length of data in bytes (limiting the data length to 255 bytes), d1 equals the value of the first byte (first data byte), dn equals the value of the last byte (last data byte), rf equals the refreshment status which may indicate the state of the corresponding data producing part of the publisher: xxxx xxx0 when invalid, and xxxx xxx1 when valid, where x means application specific. Moreover, each subscriber can control promptness of received data.

FIG. 13 depict examples of published frames. In particular, reference number 50 depicts an Application Layer frame to send to one simple device, at logical identification 32, one fresh data of one word with physical reference first byte 01, without any fault. Reference number 52 shows an Application Layer frame to send to two simple devices, at logical identifications 32 and 33, one fresh data of one word with physical reference first byte 01, without any fault. Reference number 54 depicts an Application Layer frame to send by a simple device, at logical identification 07, one fresh data of one word with physical reference first byte 00, without any fault. Reference number 56 illustrates an Application Layer frame to send by a simple device, at logical identification 07, two fresh data of one word with physical reference first byte 00 and 02, without any fault. Reference number 58 illustrates an Application Layer frame to send by a device one fresh data of one word with logical reference A000h, without any fault. Reference number 60 depicts an Application Layer frame to send by a device two fresh data of one word with logical reference A000h and A001h, without any fault. FIG. 62 shows an Application Layer frame to send by an intelligent device at logical identification 32, to other intelligent devices, one fresh default data of 8 bytes with physical reference first byte 80, without any fault. FIG. 82 depicts an Application Layer frame to send by an intelligent device at logical identification 32, to other intelligent devices, two fresh data of one word with physical reference first byte 80 and 81, without any fault.

It should be noted that this structure provides addressing capability for 32 data, each one having up to 4 application words, (application frame length of 458 bytes, without A_PDU), or 8 data with 16 application words and 24 data with 1 application word (total frame length of 504 bytes, without A_PDU).

In an embodiment, a communications adapter can be provided for interfacing between a transfer body, which can be a part of the simple device, and the communications network having the simple devices and each intelligent device connected thereto. The transfer body includes a plurality of transfer registers for communicating data relating to field devices, and an identification register for identifying the data relating to the field devices. Moreover, an interface portion is provided having an identification port communicating with the identification register, a transfer port communicating with the transfer registers, wherein the transfer body is adapted to directly attach to and communicate with each intelligent device through the interface portion. Furthermore, the communications adapter can be removably attached to the transfer body through the transfer port and the identification port, wherein the communications adapter is configured to communicate with a specific type of intelligent device. Such a communication adapter is disclosed in, for example, U.S. patent application Ser. No. 09/036,565, filed Mar. 9, 1998, and incorporated herein by reference.

While the specific embodiments have been illustrated and described, numerous modifications come to mind without significantly departing from the spirit of the invention and the scope of protection is only limited by the scope of the accompanying Claims.

I claim:

1. A method of communicating within a connectionless network having a plurality of devices operably connected via Ethernet, the method comprising the steps of:
   providing a first intra-level cluster of devices, the first intra-level cluster of devices including a first intelligent device and a first plurality of simple devices;
   publishing a first data frame via user datagram protocol (UDP) and internet protocol (IP), the first data frame being published by a first one of the first intra-level cluster of devices;
   associating a first refreshment status with the published first data frame, the first refreshment status corresponding to the time of publication of the first data frame onto the network;
   receiving the published first data frame, the first data frame being received by a second one of the first intra-level cluster of devices; and,
   providing a first promptness status responsive to the second one of the first intra-level cluster of devices, the first promptness status being associated with the received first data frame and indicative of the time of receipt of the published first data frame wherein the second one of the first intra-level cluster of devices being capable of determining the duration of the published first data frame;
   setting a timer upon one of publication of the first data frame and receipt of the published first data frame;
   maintaining one of the refreshment status and the promptness status as valid until the timer expires;
   providing a first inter-level cluster of devices, the first inter-level cluster of devices including the first intelligent device and a second intelligent device;
   publishing a second data frame via user datagram protocol (UDP) and internet protocol (IP), the second data frame being published by the first intelligent device;
   associating a second refreshment status with the published second data frame, the second refreshment status corresponding to the time of publication of the second data frame onto the network;
   receiving the published second data frame, the second data frame being received by the second intelligent device;
   providing a second promptness status responsive to the second intelligent device, the second promptness status being associated with the received second data frame and indicative of the time of receipt of the published second data frame wherein the second intelligent device being capable of determining the duration of the published second data frame; and,
   providing a second intra-level cluster of devices, the second intra-level cluster of devices including the second intelligent device and a second plurality of simple devices.

2. The method of claim 1 further comprising:
   broadcasting a network clock signal to the plurality of devices on the connectionless network wherein the first refreshment status and the first promptness status are responsive to the network clock.

3. The method of claim 2 further comprising:
   synchronizing a local clock of each of the plurality of devices with the broadcasted network clock signal.

4. The method of claim 3 wherein the publishing of the first data frame is cyclical, the cyclical publication of the first data frame being responsive to the local clock of the first one of the first intra-level cluster of devices.

5. The method of claim 1 wherein the publishing of the first data frame comprises IP multicasting for transmitting the first data frame to a predetermined group of network devices selected from the plurality of network devices.

6. The method of claim 5 further comprising:
   dynamically defining the predetermined group of network devices for receiving the first data frame via IP multicasting.

7. The method of claim 1 wherein the publishing of the first data frame is responsive to an event.

8. The method of claim 1 further comprising configuring the first one of the first intra-level cluster of devices for system communication including:
   providing a device logical identifier;
   providing a data reference;
   providing timing information; and,
   providing an IP multicast address.

9. The method of claim 1 wherein the first data frame comprises:
   an A_PDU header;
   a fault indicator for indicating the occurrence of a fault in the first one of the first intra-level cluster of devices;
   an accelerator for determining the destination of the first data frame;
   a data management field for indicating the type of data reference utilized in first data frame; and,
   a data value field.

10. The method of claim 1 wherein the first data frame is published to only a single subscriber device on the connectionless network.

11. The method of claim 1 wherein the first data frame is published via broadcasting to all of the first intra-level cluster of devices on the network.

12. The method of claim 1 wherein the step of providing a first inter-level cluster of devices includes providing a plurality of additional intelligent devices.

13. A method of communicating within a connectionless network having a plurality of devices comprising at least a publisher device and a subscriber device, the method comprising the steps of:
   providing a first intra-level cluster of devices, the first intra-level cluster of devices including a first intelligent device and a first plurality of simple devices;
   broadcasting a network clock signal throughout the connectionless network;
   publishing a first data frame via user datagram protocol (UDP) and internet protocol (IP) by a first one of the first intra-level cluster of devices;
   associating a first refreshment status with the published first data frame, the first refreshment status corresponding to the time of publication of the first data frame;
   synchronizing the first refreshment status with the network clock signal;
   subscribing to the first data frame wherein a second one of the first intra-level cluster of devices receives the published first data frame; and,
   associating a first promptness status with the published first data frame, the first promptness status being responsive to the second one of the first intra-level cluster of devices and corresponding to the time of receipt of the first data frame by the second one of the first intra-level cluster of devices wherein the second one of the first intra-level cluster of devices includes a timer capable of determining whether the duration of the published first data frame has exceeded a first predetermined time limit;
   providing a first inter-level cluster of devices, the first inter-level cluster of devices including the first intelligent device and a second intelligent device;
   publishing a second data frame via user datagram protocol (UDP) and internet protocol (IP), the second data frame being published by the first intelligent device;
   associating a second refreshment status with the published second data frame, the second refreshment status corresponding to the time of publication of the second data frame;
   subscribing to the second data frame, wherein the second intelligent device receives the second data frame; and,
   associating a second promptness status with the second data frame, the second promptness status being responsive to the second intelligent device and corresponding to the time of receipt of the published second data frame by the second intelligent device wherein the second intelligent device being capable of determining whether the duration of the published second data frame has exceeded a second predetermined time limit; and,
   providing a second intra-level cluster of devices, the second intra-level cluster of devices including the second intelligent device and a second plurality of simple devices.

14. The method of communicating of claim 13 further comprising:
   entering a network fallback mode in response to the first refreshment status.

15. The method of communicating of claim 13 further comprising:
   entering a network fallback mode in response to the first promptness status.

16. The method of communicating of claim 13 wherein the first predetermined time limit comprises:
   a propagation delay associated with processing the first data frame throughout the connectionless network; and,
   a connectionless network delay.

17. The method of claim 13 further comprising sychronizing a local clock of the first one of the first intra-level cluster of devices with the network clock.

18. The method of claim 17 wherein the publishing of the first data frame being cyclical, the cyclical publication of the first data frame being responsive to the local clock of the first one of the first intra-level cluster of devices.

19. The method of claim 13 wherein the publishing of the first data frame being responsive to an event.

20. The method of claim 13 wherein the publishing of the first data frame being via IP multicasting to the first cluster of intra-level devices.

21. The method of claim 13 wherein the publishing of the first data frame being via broadcasting to all devices on the connectionless network.

22. The method of claim 13 wherein the step of providing a first inter-level cluster of devices includes providing a plurality of additional intelligent devices.

* * * * *